ID1924662B2

(12) United States Patent
Moyers et al.

(10) Patent No.: US 9,124,662 B2
(45) Date of Patent: *Sep. 1, 2015

(54) PERSISTENT NETWORK RESOURCE AND VIRTUAL AREA ASSOCIATIONS FOR REALTIME COLLABORATION

(75) Inventors: Josh Moyers, San Francisco, CA (US); Matthew Leacock, Sunnyvale, CA (US); Paul J. Brody, Palo Alto, CA (US); David Van Wie, Eugene, OR (US); Robert J. Butler, Coralville, IA (US)

(73) Assignee: Social Communications Company, Eugene, OR (US)

( * ) Notice: Subject to any disclaimer, the term of this patent is extended or adjusted under 35 U.S.C. 154(b) by 310 days.

This patent is subject to a terminal disclaimer.

(21) Appl. No.: 13/399,775

(22) Filed: Feb. 17, 2012

(65) Prior Publication Data

US 2012/0216131 A1 Aug. 23, 2012

Related U.S. Application Data

(60) Provisional application No. 61/444,989, filed on Feb. 21, 2011.

(51) Int. Cl.
*G06F 3/048* (2013.01)
*G06F 15/16* (2006.01)
*H04L 29/06* (2006.01)

(52) U.S. Cl.
CPC ........ *H04L 65/4053* (2013.01); *H04L 65/1069* (2013.01)

(58) Field of Classification Search
USPC .................................. 715/757–759, 751–753
See application file for complete search history.

(56) References Cited

U.S. PATENT DOCUMENTS

| 5,471,318 | A | | 11/1995 | Ahuja |
| 5,491,743 | A | * | 2/1996 | Shiio et al. ............... 709/204 |
| 5,627,978 | A | | 5/1997 | Altom |
| 5,764,916 | A | | 6/1998 | Busey |
| 5,793,365 | A | | 8/1998 | Tang |
| 5,982,372 | A | | 11/1999 | Brush, II |

(Continued)

FOREIGN PATENT DOCUMENTS

| EP | 01964597 A1 | 3/2008 |
| EP | 1964597 | 9/2008 |

(Continued)

OTHER PUBLICATIONS

Search report and written opinion issued in counterpart International Application No. PCT/US2012/025655 (dated Dec. 26, 2012).
International Search Report and Written Opinion received in counterpart International Application No. PCT/US2011/047724, mailed Mar. 6, 2012.

(Continued)

*Primary Examiner* — Tadeese Hailu
*Assistant Examiner* — Darrin Hope
(74) *Attorney, Agent, or Firm* — Edouard Garcia

(57) ABSTRACT

Apparatus and methods relating to persistent network resource and virtual area associations for realtime collaboration include managing and displaying an object associated with a virtual area that supports establishment of respective presences of communicants operating respective client network nodes. Examples of the object include an object that has one or more user-modifiable property fields and an object that is associated with screen sharing functionality of the client network node.

20 Claims, 18 Drawing Sheets

(56) References Cited

U.S. PATENT DOCUMENTS

| | | | |
|---|---|---|---|
| 5,999,208 | A | 12/1999 | McNerney |
| 6,057,856 | A | 5/2000 | Miyashita |
| 6,119,147 | A | 9/2000 | Toomey |
| 6,119,166 | A | 9/2000 | Bergman |
| 6,215,498 | B1* | 4/2001 | Filo et al. ............... 345/419 |
| 6,219,045 | B1 | 4/2001 | Leahy |
| 6,237,025 | B1 | 5/2001 | Ludwig |
| 6,275,490 | B1 | 8/2001 | Mattaway |
| 6,380,952 | B1 | 4/2002 | Mass |
| 6,392,760 | B1 | 5/2002 | Ahuja |
| 6,400,381 | B1 | 6/2002 | Barrett |
| 6,572,476 | B2 | 6/2003 | Shoji |
| 6,580,441 | B2 | 6/2003 | Schileru-Key |
| 6,708,172 | B1 | 3/2004 | Wong |
| 6,714,222 | B1 | 3/2004 | Bjorn |
| 6,731,314 | B1 | 5/2004 | Cheng |
| 6,785,708 | B1 | 8/2004 | Busey |
| 6,862,625 | B1 | 3/2005 | Busey |
| 7,016,978 | B2 | 3/2006 | Malik |
| 7,036,082 | B1 | 4/2006 | Dalrymple |
| 7,058,896 | B2 | 6/2006 | Hughes |
| 7,165,213 | B1 | 1/2007 | Busey |
| 7,181,690 | B1 | 2/2007 | Leahy |
| 7,184,037 | B2 | 2/2007 | Gallery |
| 7,240,826 | B2 | 7/2007 | Abecassis |
| 7,263,526 | B1 | 8/2007 | Busey |
| 7,336,779 | B2 | 2/2008 | Boyer |
| 7,346,654 | B1 | 3/2008 | Weiss |
| 7,392,306 | B1 | 6/2008 | Donner |
| 7,474,741 | B2 | 1/2009 | Brunson |
| 7,478,086 | B2 | 1/2009 | Samn |
| 7,516,411 | B2 | 4/2009 | Grossner |
| 7,594,179 | B2 | 9/2009 | Takemura |
| 7,616,624 | B2 | 11/2009 | John |
| 7,676,542 | B2 | 3/2010 | Moser |
| 7,680,098 | B2 | 3/2010 | John |
| 7,680,480 | B2 | 3/2010 | John |
| 7,707,249 | B2 | 4/2010 | Spataro |
| 7,730,063 | B2 | 6/2010 | Eder |
| 7,734,691 | B2 | 6/2010 | Creamer |
| 7,747,719 | B1 | 6/2010 | Horovitz |
| 7,765,259 | B2 | 7/2010 | MacVarish |
| 7,813,488 | B2 | 10/2010 | Kozdon |
| 7,827,288 | B2 | 11/2010 | Da Palma |
| 7,840,668 | B1 | 11/2010 | Sylvain |
| 8,028,021 | B2 | 9/2011 | Reisinger |
| 8,191,001 | B2 | 5/2012 | Van Wie |
| 8,231,465 | B2 | 7/2012 | Yee |
| 8,397,168 | B2 | 3/2013 | Leacock |
| 2002/0049814 | A1 | 4/2002 | Yoo |
| 2002/0080195 | A1 | 6/2002 | Carlson |
| 2002/0097267 | A1 | 7/2002 | Dinan |
| 2003/0037112 | A1 | 2/2003 | Fitzpatrick |
| 2003/0043200 | A1 | 3/2003 | Faieta |
| 2003/0046374 | A1 | 3/2003 | Hilt |
| 2003/0191799 | A1 | 10/2003 | Araujo |
| 2003/0222902 | A1 | 12/2003 | Chupin |
| 2004/0030741 | A1 | 2/2004 | Wolton |
| 2004/0030783 | A1 | 2/2004 | Hwang |
| 2004/0158610 | A1 | 8/2004 | Davis |
| 2005/0071426 | A1 | 3/2005 | Shah |
| 2005/0080866 | A1 | 4/2005 | Kent, Jr. |
| 2005/0108033 | A1 | 5/2005 | Everett-Church |
| 2005/0138570 | A1 | 6/2005 | Good |
| 2005/0154574 | A1 | 7/2005 | Takemura |
| 2005/0163311 | A1 | 7/2005 | Fowler |
| 2005/0210008 | A1 | 9/2005 | Tran |
| 2005/0215252 | A1 | 9/2005 | Jung |
| 2006/0041684 | A1 | 2/2006 | Daniell |
| 2006/0117264 | A1 | 6/2006 | Beaton |
| 2006/0167972 | A1 | 7/2006 | Zombek |
| 2006/0184886 | A1 | 8/2006 | Chung |
| 2006/0248159 | A1 | 11/2006 | Polan |
| 2007/0047700 | A1 | 3/2007 | Mohler |
| 2007/0162432 | A1* | 7/2007 | Armstrong et al. ............ 707/3 |
| 2007/0220111 | A1 | 9/2007 | Lin |
| 2007/0233785 | A1 | 10/2007 | Abraham |
| 2007/0274291 | A1 | 11/2007 | Diomelli |
| 2007/0279484 | A1 | 12/2007 | Derocher |
| 2007/0286366 | A1 | 12/2007 | Deboy |
| 2007/0291034 | A1 | 12/2007 | Dones |
| 2008/0019285 | A1 | 1/2008 | John |
| 2008/0021949 | A1 | 1/2008 | John |
| 2008/0052373 | A1 | 2/2008 | Pousti |
| 2008/0059570 | A1 | 3/2008 | Bill |
| 2008/0101561 | A1 | 5/2008 | Choi et al. |
| 2008/0163090 | A1 | 7/2008 | Cortright |
| 2008/0168154 | A1 | 7/2008 | Skyrm |
| 2008/0214253 | A1 | 9/2008 | Gillo |
| 2008/0215679 | A1 | 9/2008 | Gillo |
| 2008/0215971 | A1 | 9/2008 | Gillo |
| 2008/0215972 | A1 | 9/2008 | Zalewski |
| 2008/0215973 | A1 | 9/2008 | Zalewski |
| 2008/0215974 | A1 | 9/2008 | Harrison |
| 2008/0215975 | A1 | 9/2008 | Harrison |
| 2008/0215994 | A1 | 9/2008 | Harrison |
| 2008/0235582 | A1 | 9/2008 | Zalewski |
| 2009/0063677 | A1 | 3/2009 | Forlenza et al. |
| 2009/0100355 | A1 | 4/2009 | Takemura |
| 2009/0106376 | A1 | 4/2009 | Tom |
| 2009/0113053 | A1 | 4/2009 | Van Wie |
| 2009/0113066 | A1 | 4/2009 | Van Wie |
| 2009/0132943 | A1 | 5/2009 | Minsky |
| 2009/0177659 | A1 | 7/2009 | Kim |
| 2009/0199095 | A1 | 8/2009 | Nicol, II |
| 2009/0241037 | A1 | 9/2009 | Hyndman |
| 2009/0247196 | A1 | 10/2009 | Kim |
| 2009/0254842 | A1 | 10/2009 | Leacock |
| 2009/0254843 | A1 | 10/2009 | Van Wie |
| 2009/0288007 | A1 | 11/2009 | Leacock |
| 2009/0307189 | A1 | 12/2009 | Bobbitt |
| 2010/0138492 | A1 | 6/2010 | Guzman |
| 2010/0162121 | A1 | 6/2010 | Yoakum |
| 2010/0164956 | A1 | 7/2010 | Hyndman |
| 2010/0169796 | A1 | 7/2010 | Lynk |
| 2010/0169799 | A1 | 7/2010 | Hyndman |
| 2010/0169837 | A1 | 7/2010 | Hyndman |
| 2010/0169888 | A1 | 7/2010 | Hare |
| 2010/0185733 | A1 | 7/2010 | Hon |
| 2010/0228560 | A1 | 9/2010 | Balasaygun |
| 2010/0235501 | A1 | 9/2010 | Klemm |
| 2010/0241432 | A1 | 9/2010 | Michaelis |
| 2010/0246570 | A1 | 9/2010 | Chavez |
| 2010/0246571 | A1 | 9/2010 | Geppert |
| 2010/0246800 | A1 | 9/2010 | Geppert |
| 2010/0251119 | A1 | 9/2010 | Geppert |
| 2010/0251124 | A1 | 9/2010 | Geppert |
| 2010/0251127 | A1 | 9/2010 | Geppert |
| 2010/0251142 | A1 | 9/2010 | Geppert |
| 2010/0251158 | A1 | 9/2010 | Geppert |
| 2010/0251177 | A1 | 9/2010 | Geppert |
| 2010/0257450 | A1 | 10/2010 | Go |
| 2010/0262550 | A1 | 10/2010 | Burritt |
| 2010/0322395 | A1 | 12/2010 | Michaelis |
| 2012/0216131 | A1 | 8/2012 | Moyers |
| 2012/0254858 | A1 | 10/2012 | Moyers |

FOREIGN PATENT DOCUMENTS

| | | |
|---|---|---|
| EP | 2237537 | 10/2010 |
| EP | 2239930 | 10/2010 |
| JP | 2007-122443 A | 5/2007 |
| JP | 2010-086163 A | 4/2010 |
| KR | 10-1999-0078775 A | 11/1999 |
| KR | 10-2000-0030491 A | 6/2000 |
| KR | 10-2001-0100589 A | 11/2001 |
| KR | 10-2003-0054874 A | 7/2003 |
| KR | 10-2004-0011825 A | 2/2004 |
| KR | 10-2007-0057578 A | 6/2007 |

(56) References Cited

FOREIGN PATENT DOCUMENTS

| | | |
|---|---|---|
| KR | 10-2007-0105088 A | 10/2007 |
| WO | WO0070557 | 11/2000 |
| WO | 01-84334 A1 | 11/2001 |
| WO | 01/91868 | 12/2001 |
| WO | WO0191868 | 12/2001 |
| WO | WO 2007-064174 A1 | 6/2007 |
| WO | WO2009000028 | 12/2008 |

OTHER PUBLICATIONS

Written Opinion of the International Searching Authority the issued in counterpart International Application No. PCT/US2012/025655 (dated Aug. 30, 2013).

PCT Search Report and Written Opinion in counterpart application PCTIUS2009/039470, Nov. 20, 2009.

* cited by examiner

PERSISTENT NETWORK RESOURCE AND VIRTUAL AREA ASSOCIATIONS FOR REALTIME COLLABORATION

CROSS-REFERENCE TO RELATED APPLICATIONS

Under 35 U.S.C. §119(e), this application claims the benefit of U.S. Provisional Application No. 61/444,989, filed Feb. 21, 2011, the entirety of which is incorporated herein by reference.

This application relates to the following co-pending patent applications, the entirety of each of which is incorporated herein by reference: U.S. patent application Ser. No. 12/630,973, filed Dec. 4, 2009; U.S. patent application Ser. No. 12/418,243, filed Apr. 3, 2009; U.S. patent application Ser. No. 12/631,008, filed Dec. 4, 2009; U.S. patent application Ser. No. 12/631,026, filed Dec. 4, 2009; U.S. patent application Ser. No. 12/418,270, filed Apr. 3, 2009; U.S. patent application Ser. No. 12/825,512, filed Jun. 29, 2010; U.S. patent application Ser. No. 12/354,709, filed Jan. 15, 2009; U.S. patent application Ser. No. 12/509,658, filed Jul. 27, 2010; U.S. patent application Ser. No. 12/694,126, filed Jan. 26, 2010; U.S. Provisional Patent Application No. 61/373,914, filed Aug. 16, 2010; and U.S. Provisional Patent Application No. 61/381,956, filed Sep. 11, 2010.

BACKGROUND

When face-to-face communications are not practical, people often rely on one or more technological solutions to meet their communications needs. Traditional telephony systems enable voice communications between callers. Instant messaging (also referred to as "chat") communications systems enable users to communicate text messages in real time through instant message computer clients that are interconnected by an instant message server. Some instant messaging systems and interactive virtual reality communications systems allow users to be represented by user-controllable graphical objects (referred to as "avatars"). What are needed are improved systems and methods for realtime network communications.

DETAILED DESCRIPTION

Figure 1:
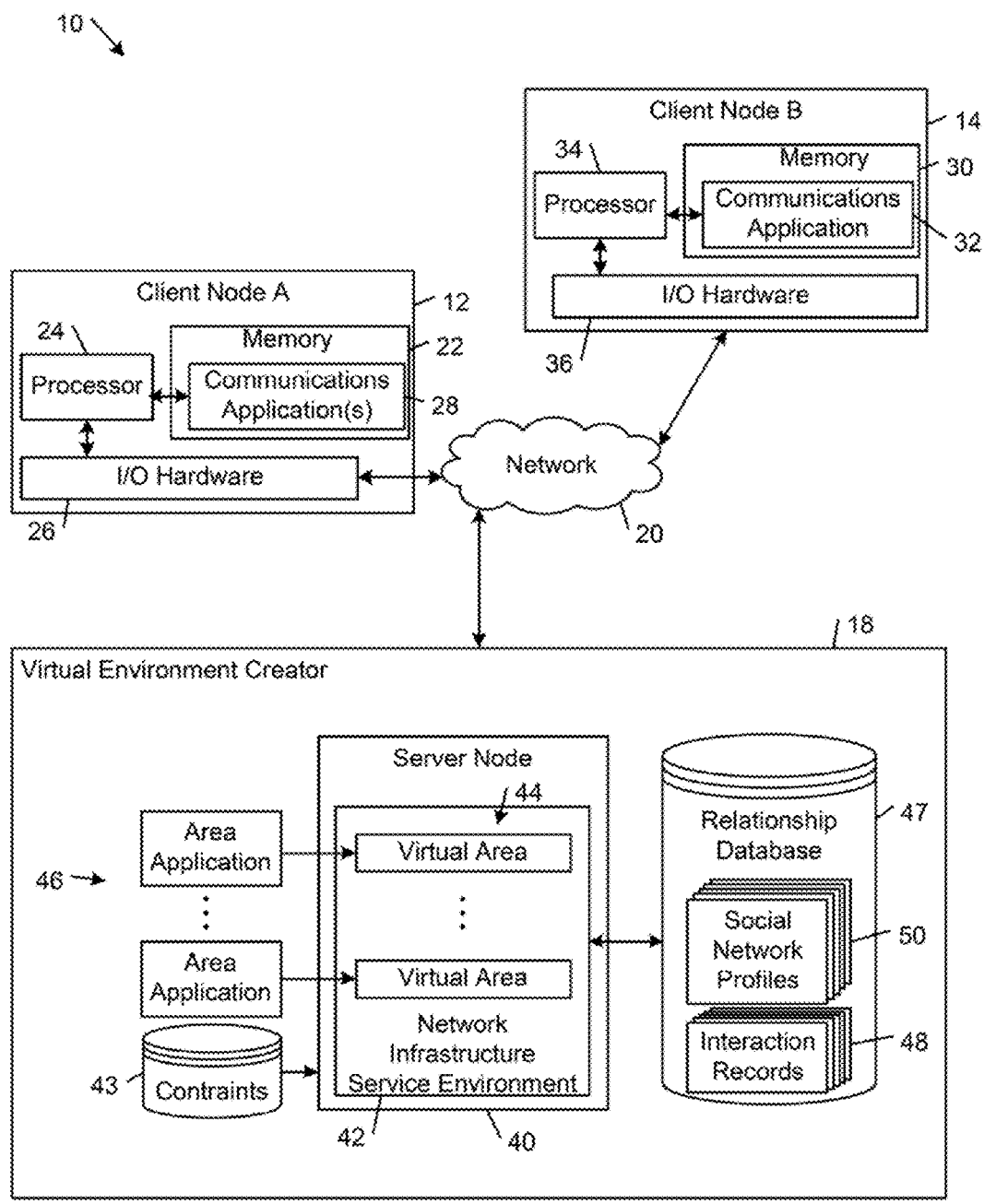
FIG. 1 is a diagrammatic view of an example of a network communications environment that includes first and second client network nodes and a virtual environment creator that includes at least one server network node.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Definition of Terms

A "communicant" is a person who communicates or otherwise interacts with other persons over one or more network connections, where the communication or interaction may or may not occur in the context of a virtual area. A "user" is a communicant who is operating a particular network node that defines a particular perspective for descriptive purposes.

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "data file" is a block of information that durably stores data for use by a software application.

The term "computer-readable medium" refers to any tangible, non-transitory medium capable storing information (e.g., instructions and data) that is readable by a machine (e.g., a computer). Storage devices suitable for tangibly embodying such information include, but are not limited to, all forms of physical, non-transitory computer-readable memory, including, for example, semiconductor memory devices, such as random access memory (RAM), EPROM, EEPROM, and Flash memory devices, magnetic disks such as internal hard disks and removable hard disks, magneto-optical disks, DVD-ROM/RAM, and CD-ROM/RAM.

A "window" is a visual area of a display that typically includes a user interface. A window typically displays the output of a software process and typically enables a user to input commands or data for the software process. A window that has a parent is called a "child window." A window that has no parent, or whose parent is the desktop window, is called a "top-level window." A "desktop" is a system-defined window that paints the background of a graphical user interface (GUI) and serves as the base for all windows displayed by all software processes.

A "data sink" (referred to herein simply as a "sink") is any of a device (e.g., a computer), part of a device, or software that receives data.

A "data source" (referred to herein simply as a "source") is any of a device (e.g., a computer), part of a device, or software that originates data.

A "network node" (also referred to simply as a "node") is a junction or connection point in a communications network. Examples of network nodes include, but are not limited to, a terminal, a computer, and a network switch. A "server" network node is a host computer on a network that responds to requests for information or service. A "client network node" is a computer on a network that requests information or service from a server.

A Uniform Resource Identifier (URI) is a string of characters that identifies a network resource.

A "network resource" is anything that can be identified by a uniform resource identifier (URI) and accessed over a network, including an electronic document, an image, a source of information, a service, operators and operands of a mathematical equation, classes, properties, numeric values, and a collection of other resources.

A "network connection" is a link between two communicating network nodes. A "connection handle" is a pointer or identifier (e.g., a uniform resource identifier (URI)) that can be used to establish a network connection with a network resource. A "network communication" can include any type of information (e.g., text, voice, audio, video, electronic mail message, data file, motion data stream, and data packet) that is transmitted or otherwise conveyed from one network node to another network node over a network connection.

A "communicant interaction" is any type of direct or indirect action or influence between a communicant and another network entity, which may include for example another communicant, a virtual area, or a network service. Examples of types of communicant communications include communicants communicating with each other in realtime, a communicant entering a virtual area, and a communicant requesting access to a resource from a network service.

"Presence" refers to the ability and willingness of a networked entity (e.g., a communicant, service, or device) to communicate, where such willingness affects the ability to detect and obtain information about the state of the entity on a network and the ability to connect to the entity.

A "realtime data stream" is data that is structured and processed in a continuous flow and is designed to be received with no delay or only imperceptible delay. Realtime data streams include digital representations of voice, video, user movements, facial expressions and other physical phenomena, as well as data within the computing environment that may benefit from rapid transmission, rapid execution, or both rapid transmission and rapid execution, including for example, avatar movement instructions, text chat, realtime data feeds (e.g., sensor data, machine control instructions, transaction streams and stock quote information feeds), screen shares, and file transfers.

A "virtual area" (also referred to as an "area" or a "place") is a representation of a computer-managed space or scene. Virtual areas typically are one-dimensional, two-dimensional, or three-dimensional representations; although in some examples a virtual area may correspond to a single point. Oftentimes, a virtual area is designed to simulate a physical, real-world space. For example, using a traditional computer monitor, a virtual area may be visualized as a two-dimensional graphic of a three-dimensional computer-generated space. However, virtual areas do not require an associated visualization. A virtual area typically refers to an instance of a virtual area schema, where the schema defines the structure and contents of a virtual area in terms of variables and the instance defines the structure and contents of a virtual area in terms of values that have been resolved from a particular context.

A "virtual area application" (also referred to as a "virtual area specification") is a description of a virtual area that is used in creating a virtual environment. The virtual area application typically includes definitions of geometry, physics, and realtime switching rules that are associated with one or more zones of the virtual area.

A "virtual environment" is a representation of a computer-managed space that includes at least one virtual area and supports realtime communications between communicants.

A "zone" is a region of a virtual area that is associated with at least one switching rule or governance rule. A "switching rule" is an instruction that specifies a connection or disconnection of one or more realtime data sources and one or more realtime data sinks subject to one or more conditions precedent. A switching rule controls switching (e.g., routing, connecting, and disconnecting) of realtime data streams between network nodes communicating in the context of a virtual area. A governance rule controls a communicant's access to a resource (e.g., an area, a region of an area, or the contents of that area or region), the scope of that access, and follow-on consequences of that access (e.g., a requirement that audit records relating to that access must be recorded). A "renderable zone" is a zone that is associated with a respective visualization.

A "position" in a virtual area refers to a location of a point or an area or a volume in the virtual area. A point typically is represented by a single set of one-dimensional, two-dimensional, or three-dimensional coordinates (e.g., x, y, z) that define a spot in the virtual area. An area typically is represented by the three-dimensional coordinates of three or more coplanar vertices that define a boundary of a closed two-dimensional shape in the virtual area. A volume typically is represented by the three-dimensional coordinates of four or more non-coplanar vertices that define a closed boundary of a three-dimensional shape in the virtual area.

As used herein, the term "includes" means includes but not limited to, the term "including" means including but not limited to. The term "based on" means based at least in part on.

II. Persistent Network Resource and Virtual Area Associations for Realtime Collaboration FIG. 1 shows an embodiment of an exemplary network communications environment 10 that includes a first client network node 12 (Client Node A), a second client network node 14 (Client Network Node B), and a virtual environment creator 18 that are interconnected by a network 20. The network 20 may include one or more of any of a local area network (LAN), a metropolitan area network (MAN), and a wide area network (WAN) (e.g., the internet). The network 20 typically includes a number of different computing platforms and transport facilities that support the transmission of a wide variety of different media types (e.g., text, voice, audio, video, and other data) between network nodes.

The first client network node 12 includes a computer-readable medium 22 (or "memory"), a processor 24, and input/output (I/O) hardware 26 (including a display). The processor 24 executes at least one communications application 28 that is stored in the memory 22. The second client network node 14 typically is configured in substantially the same general way as the first client network node 12, with a computer-readable medium 30 storing at least one communications application 32, a processor 34, and input/output (I/O) hardware 36 (including a display).

Each of the network nodes 12, 14 has a respective set of one or more sources and an exemplary set of one or more sinks. Exemplary sources include an audio source (e.g., an audio capture device, such as a microphone), a video source (e.g., a video capture device, such as a video camera), a chat source (e.g., a text capture device, such as a keyboard), a motion data source (e.g., a pointing device, such as a computer mouse), and other sources (e.g., file sharing source or a source of a customized real-time data stream). Exemplary sinks include an audio sink (e.g., an audio rendering device, such as a speaker or headphones), a video sink (e.g., a video rendering device, such as a display monitor), a chat sink (e.g., a text rendering device, such as a display monitor), a motion data sink (e.g., a movement rendering device, such as a display monitor), and other sinks (e.g., a printer for printing shared files, a device for rendering real-time data streams different from those already described, or software that processes real-time streams for analysis or customized display).

The virtual area platform 18 includes at least one server network node 40 that provides a network infrastructure service environment 42 that manages sessions of the first and second client nodes 12, 14 in one or more virtual areas 44 in accordance with respective virtual area applications 46. One or more of the virtual area applications 44 typically are synchronous conferencing applications that support one or more types of communications between the client nodes 12, 14 (e.g., text chat, audio conferencing, video conferencing, application sharing, and file sharing). The network infrastructure service environment 42 typically includes one or more network infrastructure services that cooperate with the communications applications 28, 32 in the process of establishing and administering network connections between the client nodes 12, 14 and other network nodes. Among the network infrastructure services that are included in the example of the network infrastructure service environment 42 are an account service, a security service, an area service, a rendezvous service, an interaction service, and a capabilities engine. The area service administers a virtual area 44 by managing sessions of the first and second client nodes 12, 14 in the virtual area 44 in accordance with the virtual area application 46. Examples of the virtual area platform 18 and the virtual area applications 46 are described in U.S. Provisional Patent Application No. 61/563,088, filed Nov. 23, 2011. Examples of an account service, a security service, an area service, a rendezvous service, and an interaction service are described in U.S. patent application Ser. No. 12/630,973, filed Dec. 4, 2009. Examples of a capabilities engine are described in U.S. Provisional Patent Application No. 61/535,910, filed Sep. 16, 2011.

The network infrastructure service environment 42 maintains a relationship database 47 that contains the records 48 of interactions between communicants and social network profiles 50 that are associated with respective communicants. Each interaction record describes the context of an interaction between a pair of communicants. For example, in some examples, an interaction record contains one or more of an identifier for each of the communicants, an identifier for the place of interaction (e.g., a virtual area instance), a description of the hierarchy of the interaction place (e.g., a description of how the interaction room relates to a larger area), start and end times of the interaction, and a list of all files and other data streams that are shared or recorded during the interaction. In some examples, each interaction is tracked independently such that, for a given pair of communicants, there is a list of relationship event records, each of which records a single respective interaction (e.g., sent a chat message, streamed audio for 93 seconds, shared file X, etc.). Thus, for each realtime interaction, the network infrastructure service environment 42 tracks when it occurred, where it occurred, and what happened during the interaction in terms of communicants involved (e.g., entering and exiting), objects that are activated/deactivated, and the files that were shared. Each social network profile 50 typically includes: identity characteristics (e.g., name, age, gender, and geographic location information such as postal mailing address) that describe a respective communicant or a persona that is assumed by the communicant; explicit relationship information that is declared by the communicant; and relationship information that is inferred from the communicant's interactions in the network communication environment 10.

The communications applications 28, 32, the area applications 46, and the network infrastructure service environment 42 together provide a platform (referred to herein as "the platform") that administers the realtime connections with network nodes in a communication context that is defined by an instance of a virtual area subject to a set of constraints 43 that control access to the virtual area instance.

The communications applications 28, 32 present respective views of the virtual areas 44 in accordance with data received from the network infrastructure service environment 42 and provide respective interfaces for receiving commands from the communicants and providing a spatial interface that enhances the realtime communications between the communicants. The communicants typically are represented in the virtual areas 44 by respective avatars (e.g., sprites), which typically move about the virtual areas 44 in response to commands that are input by the communicants at their respective network nodes. In some examples, the communications applications 28, 32 establish realtime data stream connections between the first and second client network nodes 12, 14 and other network nodes sharing the virtual area 44 based on the positions of the communicants' avatars in the virtual areas 44 as described in U.S. Pat. Nos. 7,769,806 and 7,844,724.

Among the software components executing on the client network nodes 12, 14 are a user interface component and a browser component. The browser component provides a set of web browsing functions, including browser functions, document viewing functions, and data downloading functions. The user interface component generates a graphical user interface that interfaces the user to the realtime communications and network browsing functionalities of the browser component. The browser component may be integrated into the communications applications 28, 32 or it may be implemented by a separate browser component (e.g., a plug-in) that exposes an API through which the communications applications 28, 32 may call methods that are available from the browser component, including browsing methods, document viewing methods, and data downloading methods.

The network connections between network nodes may be arranged in a variety of different stream handling topologies, including a peer-to-peer architecture, a server-mediated architecture, and hybrid architectures that combine aspects of peer-to-peer and server-mediated architectures.

In some embodiments, the server network node 40 remotely manages client communication sessions and remotely configures audio and graphic rendering engines on the client network nodes 12, 14, as well as switching of data streams by sending instructions (also referred to as definitions) from the remotely hosted area applications 46 to the client network nodes in accordance with the stream transport protocol described in U.S. patent application Ser. No. 12/825,512, filed Jun. 29, 2010, the entirety of which is incorporated herein by reference. In some of these embodiments, the server node(s) 40 send to each of the client nodes 12, 14 provisioning messages that configure the client nodes 12, 14 to interconnect respective data streams between active ones of their complementary sources and sinks in accordance with switching rules specified in the server applications 46.

The platform tracks communicants' realtime availabilities and activities across the different communication contexts that are defined by the area applications 46. This information is presented to the communicants in the form of realtime visualizations that enable the communicants to make more informed network interaction decisions (e.g., when to interact with a contact) and encourages the communicants to initiate interactions with other communicants and to join contexts (e.g., an ongoing conversation between communicants) of which the communicants otherwise would not have been aware. In some embodiments, the realtime visualization includes visual cues as to the presence and activities of the communicants in the contexts of the server applications. The presentation of these visual cues typically depends on one or more of governance rules associated with the virtual areas 44, administrative policies, and user preferences (including preferences regarding the exportation of the user's presence and the connection of the user to areas and other communicants), which may define tiered relationship based predicates that control access to presence information and/or resources on a zone-by-zone basis.

Figure 2:
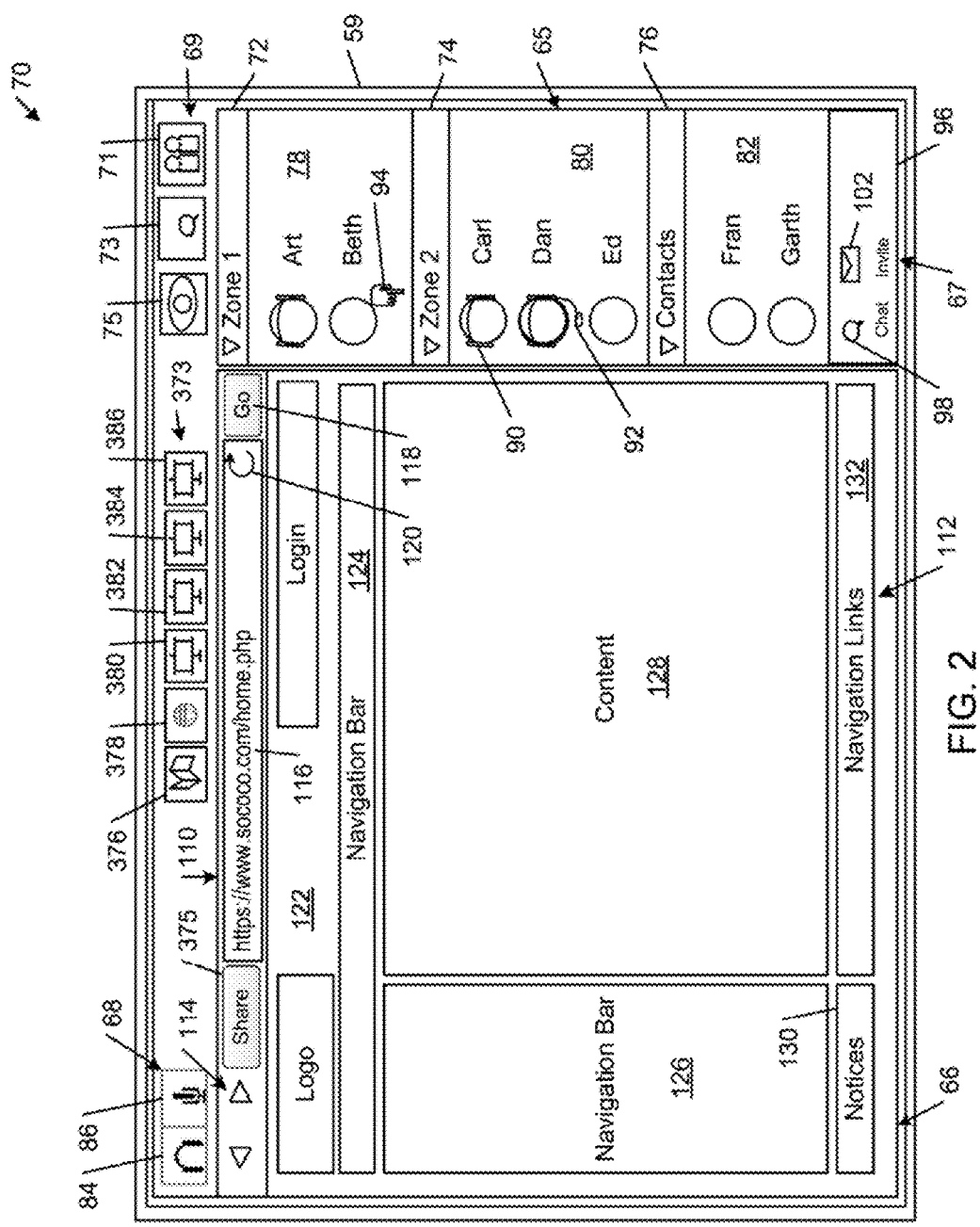
FIGS. 2-22 are respective diagrammatic views of graphical user interface examples.

FIG. 2 shows an exemplary graphical user interface 70 that is generated by an example of the communications application 28 in a window 59 on a display of the client network node from which a user of the client application ("Art" in this example) is operating. The graphical user interface 70 includes a people panel 65, a viewer panel 66, a people interaction toolbar 67, an audio interaction toolbar 68, and a set of panel view controls 69.

The people interaction toolbar 67 includes a Chat button 98 and an Invite button 102. Selection of the Chat button 98 opens a chat panel 140 (see FIG. 4) that enables Art to initiate a chat with other communicants who are present in the area application where Art is present (i.e., Zone 1 in the illustrated example). Selection of the Invite button 102 opens an Invite window that enables Art to invite one or more communicants to a selected virtual area location (e.g., an area application or zone within that area application). Additional details regarding embodiments of the methods and functions invoked by the Chat button 98 and the Invite button 102 are described in U.S. patent application Ser. No. 12/354,709, filed Jan. 15, 2009, and U.S. Provisional Patent Application No. 61/373,914, filed Aug. 16, 2010.

The audio interaction toolbar 68 includes a headphone control 84 that enables Art to toggle on and off the local speakers of the client network node, and a microphone control 86 that enables Art to toggle on and off the local microphone of the client network node.

The panel view controls 69 include a people panel button 71 for opening and closing the people panel 65, a chat panel button 73 for opening and closing a chat panel (see FIG. 6), and a viewer panel button 75 for opening and closing the viewer panel 66.

The people panel 65 depicts the realtime availabilities and activities of some or all of Art's contacts across different communication contexts. In the example shown in FIG. 2, the people panel 65 shows Art's communicants segmented into two virtual area groups 72, 74 and a contacts group 76. The virtual area groups 72, 74 correspond to each of the area applications 44 of which Art is a member with respect to which at least one of Art and Art's contacts is present. The contacts group 76 contains all or a selected portion of Art's contacts that are not represented in any of the virtual area groups. The first virtual area group 72 of communicants is contained within a section 78 (labeled with a header bar entitled "Zone 1") that identifies all the communicants who have a presence in the area application "Application 1". The second virtual area group 74 of communicants is contained within a section 80 (labeled with a header bar entitled "Zone 2") that identifies all the communicants who have a presence in the area application "Application 2". The contacts group 76 of communicants is contained within a section 82 (labeled with a header bar entitled "Contacts") that identifies all of Art's contacts who are not shown in any of the first and second virtual area groups 72, 74 (i.e., they either are not members of or not present in any of Zone 1 and Zone 2).

In the example shown in FIG. 2, the virtual area sections 78, 80 contain the graphical representations (avatars) of the communicants (including at least one of Art or Art's contacts) who currently have presence in the respective area applications 44, and the contacts section 82 contains graphical representations (avatars) of all of the remaining ones of Art's contacts that are not present in or not members of any of Zone 1 and Zone 2. In the illustrated example: Art and Beth are members of server Zone 1; Art, Carl, Dan, and Ed are members of Zone 2; and Fran and Garth are not members of Zone 1 nor Zone 2. In this example, Fran and Garth are contacts of Art who are not presented in Zone 1 or Zone 2.

Each communicant is represented graphically by a respective circular sprite that is labeled with a respective user name of the communicant (i.e., "Art," "Beth," "Carl," "Dan," "Ed," "Fran," and "Garth"). Each sprite also may be associated with a respective status line that includes additional information about the communicant. In some embodiments, each status line can include one or more of the following information: location of presence (e.g., a server application or a zone of that sever application); availability (e.g., busy, idle); a status message (e.g., "Out of the office next Wednesday"); and the name of the client node from which the communicant is operating (e.g., "workstation 1" or "mobile phone"). In some embodiments, the ordering of the spatial positions (e.g., from top to bottom) of the communicant avatars in each of the sections 78, 80, 82 is alphabetical by user name. In other embodiments, the spatial positions of the communicant avatars in each of the server application sections 78, 80 are ordered in accordance with the temporal ordering of the communicants in terms of the times when the communicants established their respective presences with the server applications. The spatial positions of the communicant avatars in the contacts section 82 may be sorted alphabetically by user name, according to frequency of contact, according to recentness of contact, or according to other sorting or filtering criteria.

The activities of the communicants in the contexts of the area applications 44 may be inferred from the activities on the communication channels over which the respective communicants are configured to communicate. The activities on the communication channels are shown in the graphical user interface 70 by visual cues that are depicted in association with the graphical representations of the communicants in the sections 78, 80, 82. For example, the "on" or "off" state of a communicant's local speaker channel is depicted by the presence or absence of a headphones graphic 90 on the communicant's sprite. When the speakers of the communicant who is represented by the sprite are on, the headphones graphic 90 is present (see sprites Art, Carl, and Dan) and, when the communicant's speakers are off, the headphones graphic 90 is absent (see sprites Beth and Ed). The "on" or "off" state of the communicant's microphone is depicted by the presence or absence of a microphone graphic 92 on the communicant's sprite. When the communicant's microphone is on, the microphone graphic 92 is present (see sprite Dan); and, when the communicant's microphone is off, the microphone graphic 92 is absent (see sprites Art, Beth, Carl, and Ed). The headphones graphic 90 and the microphone graphic 92 provide visual cues of the activity states of the communicant's sound playback and microphone devices. In addition, the current activity on a communicant's microphone channel is indicated by a dynamic visualization that lightens and darkens the communicant's avatar in realtime to reflect the presence or absence of audio data on the microphone channel. Thus, whether or not their local speakers are turned on, communicants can determine when another communicant is speaking by the "blinking" of the coloration of that communicant's avatar. The activity on a communicant's text chat channel is depicted by the presence or absence of the hand graphic 94 adjacent the communicant's sprite (see sprite Beth). Thus, when a communicant is transmitting text chat data to another network node the hand graphic 94 is present, and when a communicant is not transmitting text chat data the hand graphic 94 is not present. In some embodiments, text chat data is transmitted only when keyboard keys are depressed, in which case the visualization of the communicant's text channel appears as a flashing on and off of the hand graphic 94.

In the example shown in FIG. 2, members of an area application are able to receive the visual cues of the communicant activities occurring in the context of that area application whether or not the member is present. Thus, the graphical user interface 70 that is presented to Art shows visual cues indicating the activity on the communication channels of the communicants present in Zone 1 (where Art is present) and the communication channel activities of the communicants present in Zone 2 (where Art is not present).

Additional details regarding embodiments of the people panel 65 are described in U.S. Provisional Patent Application No. 61/373,914, filed Aug. 16, 2010, and U.S. patent application Ser. No. 12/354,709, filed Jan. 15, 2009.

The viewer panel 66 includes a navigation area 110 and a display area 112.

FIG. 2 shows an example of the graphical user interface 70 when the people panel 65 is open and the viewer panel 66 is open in the browser mode.

The navigation area 110 includes forward and back buttons 114, a location bar 116, a Go button 118, and a reload button 120. The forward and back buttons 114 enable a user to traverse a navigation stack of uniform resource identifier (URI) addresses (e.g., a linked list of previously visited URLs). The location bar 116 allows a user to specify a URI address of a network resource, and the Go button 118 invokes one or more browser functions on the client network node to navigate to the specified URI address and render the network resource at the specified URI address in the display area 112. The reload button 120 invokes one or more browser functions on the client network node to reload the graphic representation of the network resource currently displayed in the display area 112.

The display area 112 contains the rendered depictions of network resources located at the URI address specified in the navigation area 110. In the example shown in FIG. 14, the viewer panel 66 is in the browser view mode and shows a rendered view of the network resource (a web page in this example) that is located at the URL https://www.sococo.com/home.php, as indicated in the location bar 116. In the illustrated example, the display area 110 shows a web page that includes a header section 122, a top navigation bar 124, a side navigation bar 126, a contents section 128, a notices section 130, and a navigation links section 132.

In addition to the control and panel elements of the graphical user interface 70 (e.g., the people panel 65, the viewer panel 66, the people interaction toolbar 67, the audio interaction toolbar 68, and the panel view controls 71, 73, 75), the graphical user interface 70 includes a Share button 375 and a set 373 of Viewer Panel control buttons, including a Map button 376, a Browse button 378, and four View Screen buttons 380-386. The Share button 375 initiates a screen share of the contents of the display area 112 of the viewer panel 66 in connection with a view screen object in a virtual area. These contents include, for example, renderings of any information that is received by the browser component in connection with the network resource identified in the location bar 116, and a document or application that is being shared by the user in connection with a view screen object in a virtual area. The Map button 376 sets the view presented in the viewer panel 66 to a map view of the virtual area. The Browse button 378 sets the view presented in the viewer panel 66 to a browser view. Each of the four View Screen buttons 380-386 sets the viewer panel 66 to display the content being shared in connection with a corresponding one of the view screen objects in the virtual area.

Figure 3:
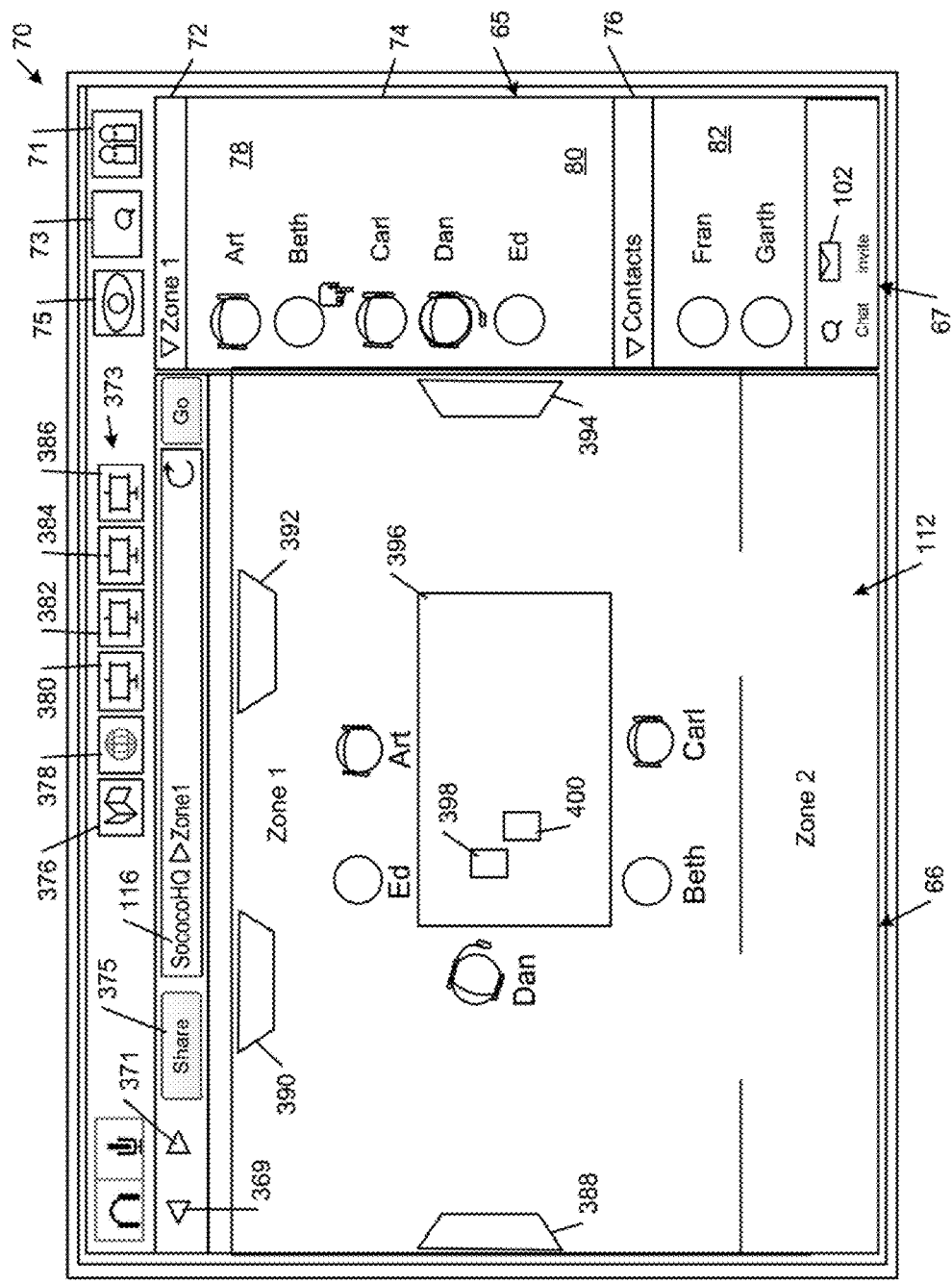

FIG. 3 shows an example of the graphical user interface 70 in the Map view mode presenting in the viewer panel 66 a rendered view of a zone (Zone 1) of the virtual area SococoHQ that is located at the location SococoHQ/Area1, as indicated in the location bar 110.

Each of the communicants who is present in the virtual area is represented graphically by a respective avatar that corresponds to the communicant's avatar that is shown in the people panel 65. The virtual area is represented graphically by a two-dimensional top view of a rectangular space. In some examples, the communicants' sprites automatically are positioned in predetermined locations (or "seats") in the virtual area when the communicants initially enter the virtual area.

The virtual area includes four view screen objects 388, 390, 392, 394 and a table object 396. Communicants interact with the objects by selecting them with an input device (e.g., by single-clicking on the objects with a computer mouse, touch pad, touch screen, or the like). The view screen objects 388-394 are associated with application sharing functionality of the platform that enables communicants to share applications operating on their respective client network nodes. The application sharing functionality is invoked by activating a view screen object (e.g., by single-clicking the view screen object with an input device). In some embodiments, the platform provides visual cues that indicate whether or not a communicant is sharing an application over an application sharing channel. In response to a communicant's selection of the view screen object, the communicant's sprite automatically is moved to a position in the graphical representation of the virtual area that is adjacent the view screen object. The position of a communicant's sprite adjacent the view screen object indicates that the communicant currently is sharing or is about to share an application with the other communicants in the virtual area. In addition, the avatar of each communicant who is viewing a shared application (including the sharing communicant) is depicted with a pair of "eyes" to indicate that the represented communicants are viewing the content being shared in connection with the view screen objects (see, e.g., the avatars of Alex and Dan in FIG. 5). The graphical depiction of view screen object is changed depending on whether or not an active application sharing session is occurring. For example, the depicted color of the view screen may change from a brighter color during an active application sharing session to a darker color when there is no application sharing taking place. Examples of the application sharing process are described in connection with FIGS. 26-28 of U.S. patent application Ser. No. 12/354,709, filed Jan. 15, 2009, and in U.S. patent application Ser No. 12/418,270, filed Apr. 3, 2009.

The table object 396 is associated with file sharing functionality of the platform that enables communicants to upload computer data files to server storage in association with the virtual area and to download data files that are associated with the virtual area from the server storage to the respective client network nodes. In example shown in FIG. 3, there are two document objects 398, 400 that are associated with the table object 396. The document objects 398, 400 are linked to respective documents that are have been shared in the virtual area and stored in server storage. Any of the document objects 398, 400 may be selected by a communicant (e.g., by double-clicking the document object 190 with an input device, such as a computer mouse) to initiate downloading of the associated document to the communicant's client network node. Additional details regarding the structure, function, and operation of the table object 396 may be obtained from U.S. patent application Ser. No. 12/354,709, filed Jan. 15, 2009.

In the Map view mode, the navigational controls of the graphical user interface 70 allow the user to traverse a path through the virtual environment in accordance with a navigational model that is tied to the underlying spatial hierarchy of virtual area locations and objects within the locations. The network infrastructure service environment records the path traversed by the user. In some embodiments, the network infrastructure service environment records a history that includes a temporally ordered list of views of the virtual area locations that are presented to the user as the user navigates through the virtual area. Each view typically corresponds to a view of a respective renderable zone of the virtual area. In these embodiments, the navigation controls enable the user to move to selected ones of the zones in the history. The navigation controls also include a graphical representation of a depth path that shows the location in the spatial hierarchy that corresponds to the user's current view of the virtual area. In some embodiments, the graphical representation of the depth path includes a respective user-selectable link to a respective view of each of the preceding levels in the spatial hierarchical model of the virtual area above the current view. The back button 369 corresponds to a backward control that enables the user to incrementally move backward to preceding ones of the zones in the history of the zones that were traversed by the user. The forward button 371 corresponds to a forward control that enables the user to incrementally move forward to successive ones of the zones in the history of the zones that were traversed by the user. Some examples additionally include a placemarks button that activates a placemarking control for storing links to zones and a placemark navigation control for viewing a list of links to previously placemarked zones. In response to user selection of the placemarking control, a placemark is created by storing an image of the location shown in the current view in association with a hyperlink to the corresponding location in the virtual area. In response to a user selection of the placemark navigation control, a placemarks window is presented to the user. The placemarks window includes live visualizations (showing, e.g., where communicants are located and visual cues of their realtime activities) of all locations that have been placemarked by the user. Each of the images in the placemarks window is associated with a respective user-selectable hyperlink. In response to user selection of one of the hyperlinks in the placemarks window, a view of the virtual area corresponding to the location associated with the selected hyperlink is automatically displayed in the browsing area of the graphical user interface 70. Some examples include home button corresponds to a control that returns the user to a view of a designated "home" location in the virtual environment. Additional details regarding the structure, function, and operation of examples of the navigation controls are described in U.S. patent application Ser. No. 12/354,709, filed Jan. 15, 2009.

Figure 4:
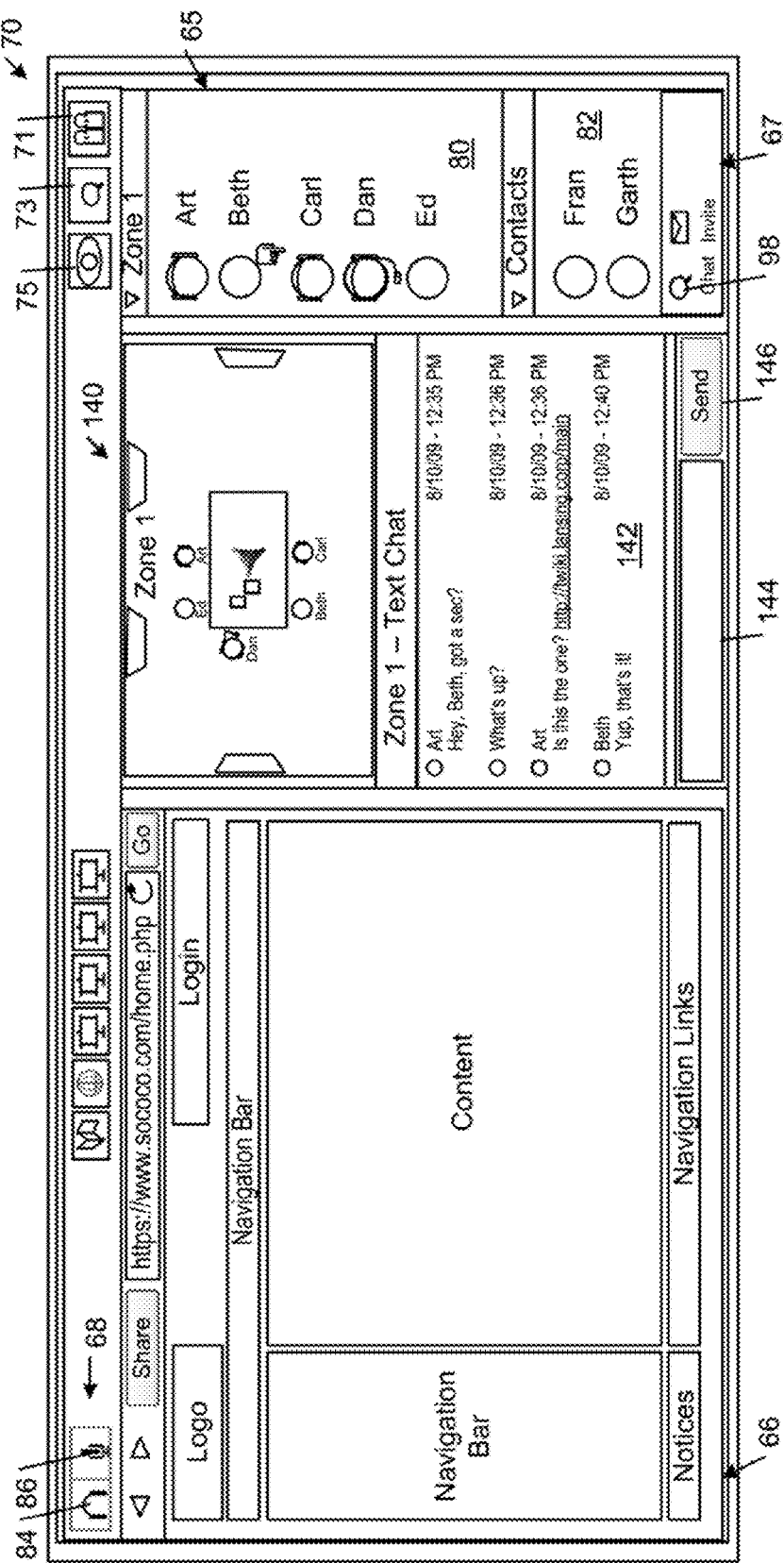

FIG. 4 shows an example of the graphical user interface 70 when the people panel 65, a chat panel 140, and the viewer panel 66 are open.

Activating the chat panel button 73 or the chat button 98 opens the chat panel 140. When the chat panel button 73 is activated, the Chanel panel 140 opens to show a chat interface for a persistent virtual chat area for interactions occurring in connection with a respective virtual area. In the example shown in FIG. 4, Art activated the chat panel button 73 at the time he was present in Zone 1; therefore, the chat panel 140 shown in FIG. 4 contains the persistent virtual chat area for text chat interactions occurring in Zone 1. When the chat button 98 is activated, on the other hand, the chat panel 140 opens to show a chat interface for a persistent personal virtual area for interactions between Art and a selected one of the communicants. Examples of personal virtual areas are described in U.S. patent application Ser. No. 12/509,658, filed Jul. 27, 2009.

The chat interface of the chat panel 140 includes a chat log area 142, a text box 144, and a Send button 146. The chat panel 402 also includes a minimap view of the current zone (Zone 1) in which the user is present. In this example, the user may enter text messages in the text box 144 and activate the Send button 146 to transmit the text messages to the other communicants who are present in the zone.

The user may enter text messages in the text box 144 and transmit the text messages to the other communicants who are in the same zone by selecting the Send button 146. The chat log area 142 displays a log of current and optionally prior events that are associated with the current zone. An exemplary set of events that may be displayed in the chat log area 142 include: text messages that the user has exchanged with other communicants in the current zone; changes in the presence status of communicants in the current zone; changes in the speaker and microphone settings of the communicants in the current zone; and the status of the objects in the zone (discussed below), including references to any applications and data files that are shared in connection with the objects. In the illustrated embodiments, the events are labeled by the communicant's name followed by content associated with the event (e.g., a text message) or a description of the event.

The chat panel 140 provides a context for organizing the presentation of the events that are displayed in the chat log area 142. For example, in the illustrated embodiment, each of the displayed events is labeled with a respective tag that visually correlates with the appearance of the sprite of the communicant that sourced the displayed event. In particular, each of the events that is sourced by a particular one of the communicants is labeled with a respective icon 148, 150, 152, 154 having a visual appearance (e.g., color-code, or design pattern) that matches the visual appearance of that communicant's sprite. In this example, the color of the icons 148, 152 matches the color of the body of Art's sprite, and the color of the icon 150, 154 matches the color of the body of Beth's sprite.

In the examples described below, the platform enables a communicant to associate objects in zones of a virtual area with network resources, and maintains those associations across sessions to provide zones with persistent network resource associations that can be accessed immediately upon entry into the zones. In these examples, an object (e.g., a view screen object) in a zone of a virtual area has a configurable uniform resource identifier (URI) property that a communicant can configure to associate a network resource with the object and thereby create "spatial bookmarks" for the network resources at the respective object locations in the zones of the virtual area. In this way, a communicant can customize a zone of a persistent virtual area with any type of network accessible resources to suit any particular purpose and then share the network resources with other communicants in the zone. For example, communicants can associate view screen objects in a zone of a virtual area with respective cloud-based services that relate to a particular project or business function (e.g., finance, accounting, software development, project management). The platform stores persistent records of the state of each zone of the virtual area, including the service associations with objects and the communicant interactions (e.g., chat, recordings, shared documents) that occurred in the zone so that each time the communicants enter the zone they can continue where the left off with single-click access to the services that are relevant to the particular project or business function associated with the zone. Being able to place and keep services running in a zone of a virtual area means that meetings start with live application information (e.g., network resource information, stored documents, prior chat conversations, and recorded audio conversations) already in the zone, and can restart where communicants left a discussion at the end of the previous meeting.

Figure 5:
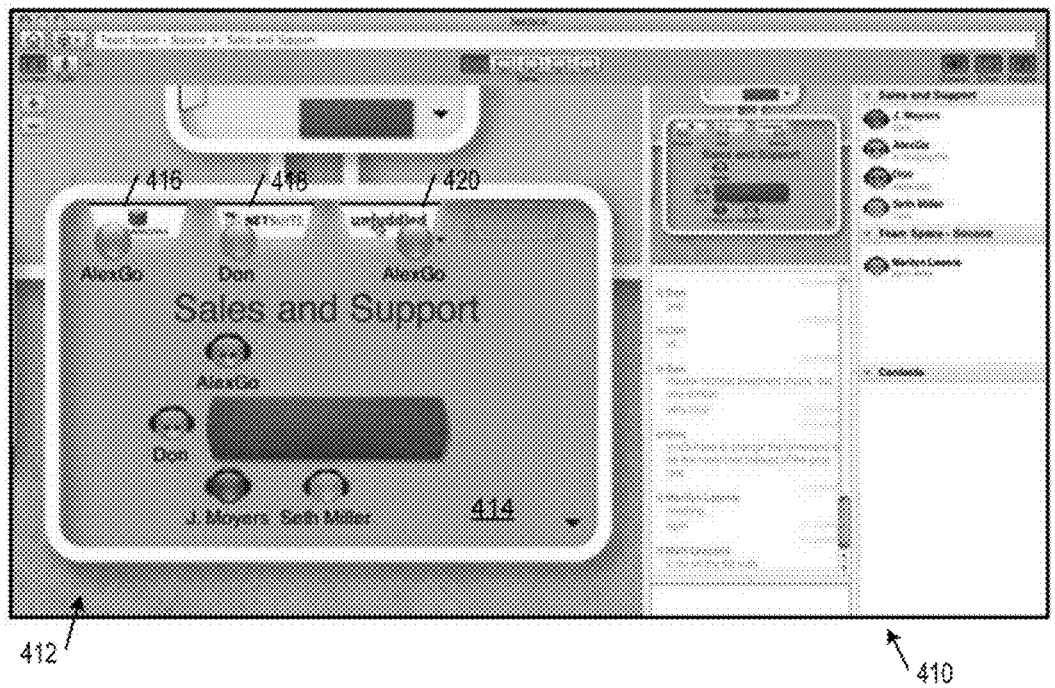

FIG. 5 shows an example 410 of the graphical user interface 70 (FIG. 2) that includes a viewer panel 412 that shows an example of a zone 414 (labeled "Sales and Support") of the virtual area Team Space that includes three view screen objects 416, 418, 420 that are associated with respective network resources. In this example, each network resource is a network accessible service (i.e., SugarCRM, Netsuite, and Unfuddle) that is associated with a respective URI (i.e., http://www.sugarcrm.com, http://www.netsuite.com, and http://www.unfuddle.com). The services associated with the view screen objects 416, 418, 420 are being accessed by the browser component on the client network nodes of the communicants who currently are screen sharing in connection with the view screen objects 416, 418, 420 in the zone 414. In this regard, the contents of network resources shared by the communicant currently in charge of running view screen objects (i.e., the moderators who might be, e.g., the communicants who initially activated the view screen objects) automatically are captured from these communicants' client network node and sent to the other communicants who have activated the corresponding view screen objects. In the example shown in FIG. 5, Alex Go is the communicant who initially activated the SugarCRM and Unfuddle services and Don is the communicant who initially activated the Netsuite service. The client network nodes being operated by Alex Go and Don are screen sharing these services with the other communicants in the Sales and Support zone 414 (i.e., J. Moyers and Seth Miller) using the screen sharing functionality of the client applications executing on their respective client network nodes. In this way, all of the communicants in the zone 414 can collaborate together in the context of the joint network resource interactions of Alex Go and Don in connection with the SugarCRM, Netsuite, and Unfuddle services. In these examples, all the communicants who activate the same view screen object will see exactly the same network resource contents via screen sharing.

Figure 6:
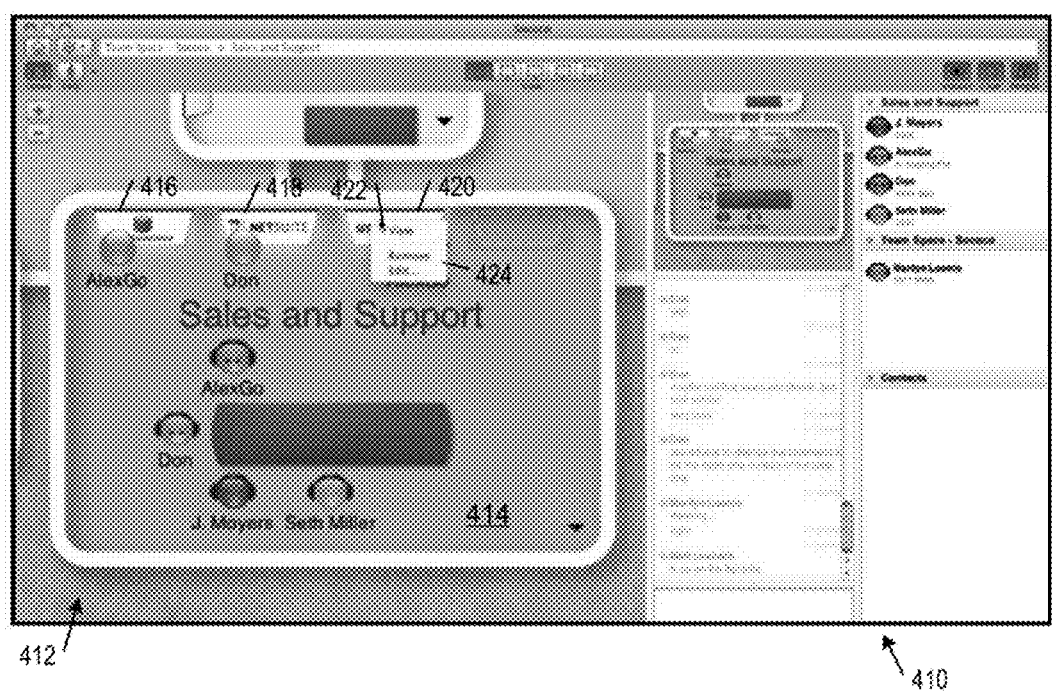

FIG. 6 shows the graphical user interface 410 after Alex Go has activated the view screen object 420 with his pointer 422 (e.g., by single-clicking on the graphical representation of the view screen object). In response to the positioning of the pointer 422 over the view screen object 420, the boundary of the view screen object 420 is highlighted to indicate that its properties can be configured. In response to activation of the view screen object 420, the platform generates a dialog box 424 that presents options for configuring the view screen object 420. In this example, Alex Go is able to select one of the following operations: "view" the object, "remove" the object, or "edit" the properties of the object. The "view" operation shows the current state of the view screen object 422. The "remove" operation removes the current properties of the view screen object 420. The "edit" operation opens another dialog box that allows Alex Go to modify the properties of the view screen object (e.g., change the URI associated with the view screen object 420).

Figure 7:
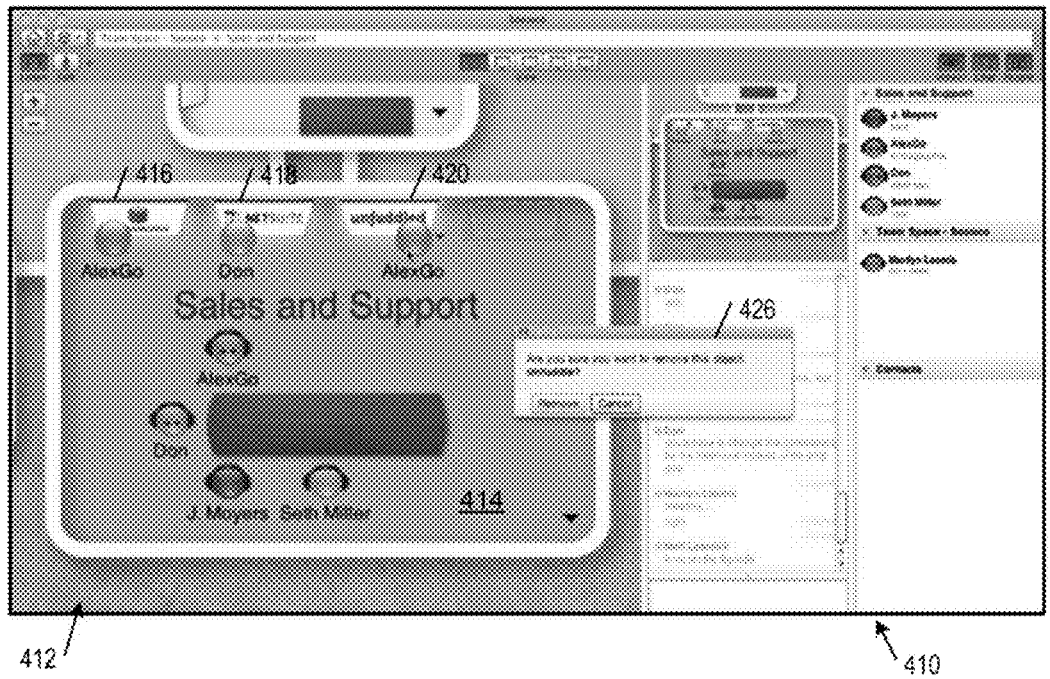

FIG. 7 shows a confirmation dialog box 426 that is generated in response to Alex Go's selection of the "remove" operation in connection with the view screen object 420 shown in FIG. 6. The confirmation dialog box 426 presents the options to "remove" the properties associated with the view screen object or "cancel" the remove operation.

Figure 8:
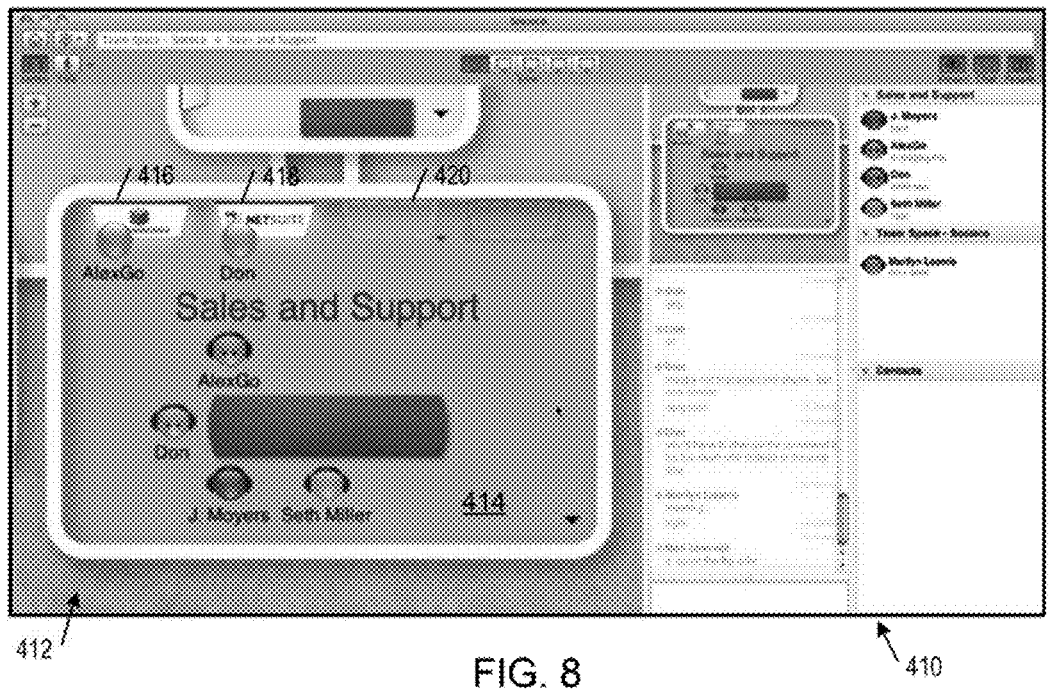

FIG. 8 shows the virtual area 414 after Alex Go has selected the "remove" button in the confirmation dialog box 426 shows in FIG. 7. In this example, the unprovisioned view screen object 420 is represented by a dashed boundary to indicate that the view screen object 420 is not associated with a network resource and consequently is inactive.

Figure 9:
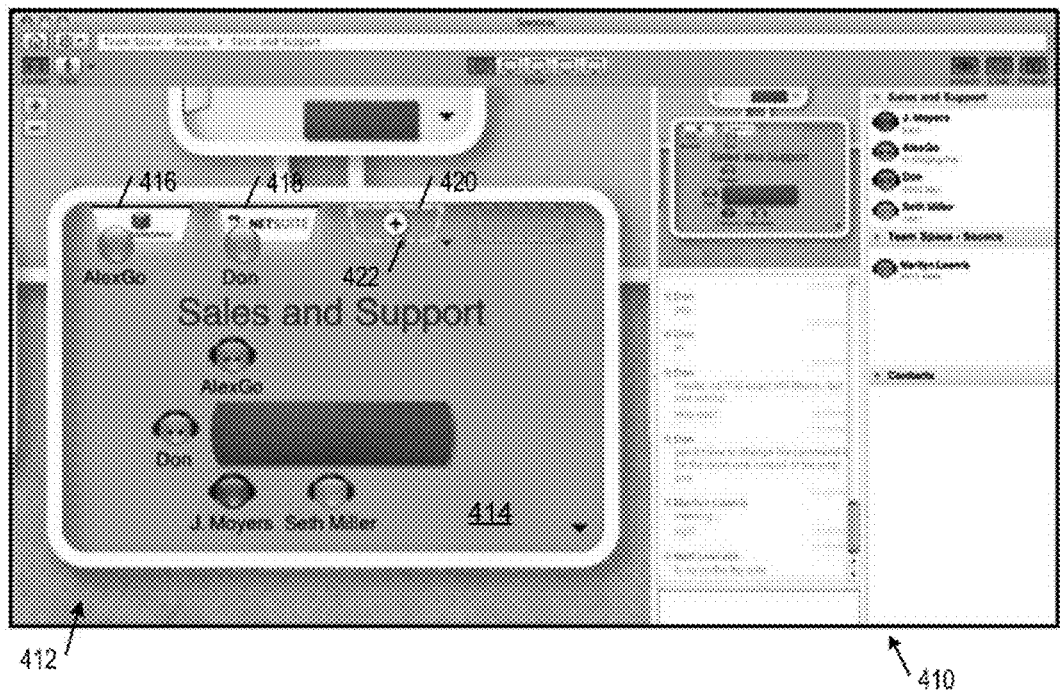

FIG. 9 shows the graphical user interface 410 after Alex Go has moved his pointer 422 over the unprovisioned view screen object 420. In response to the positioning of the pointer 422 over the unprovisioned view screen object 420, the dashed boundary of the view screen object 420 is highlighted and a "+" signed is displayed to indicate that the properties of the view screen object 420 can be configured.

Figure 10:
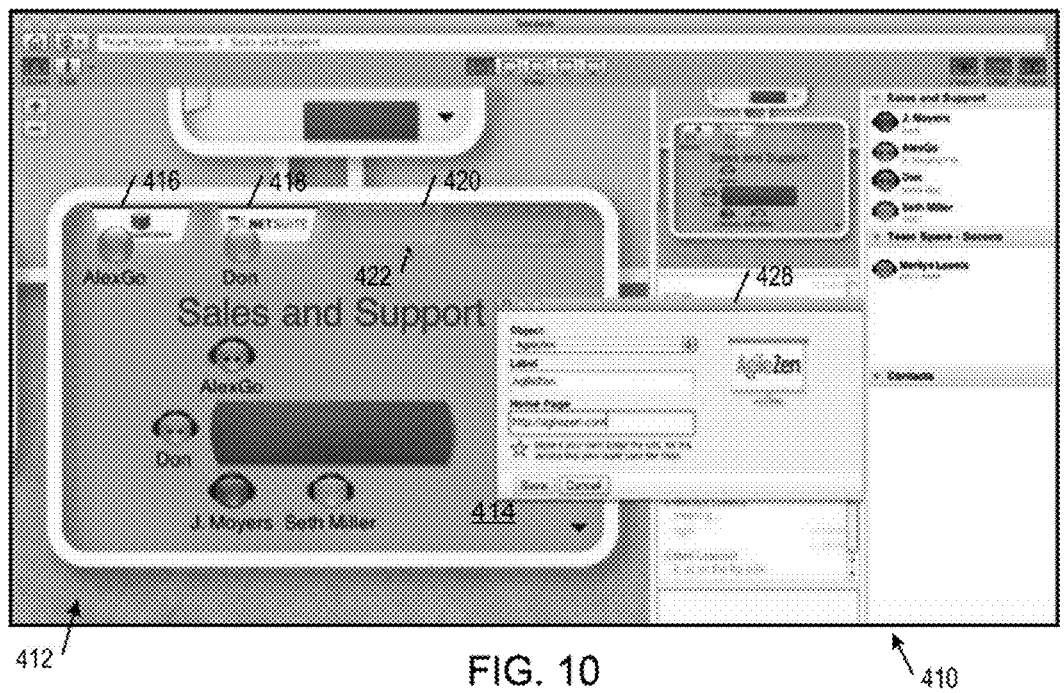

Referring to FIG. 10, in response to activation of the view screen object 420, the platform generates a dialog box 428 that presents options for configuring the properties of the view screen object 420. In this example, Alex Go is able to select one of the following operations: select one of a predefined set of network resources or an option to define a non-predefined (custom) network resource to associate with the "Object"; input a "Label" for the "Object"; and input a URI (e.g., http://agilezen.com) to associate with the "Object". If a predefined network resource is selected, the platform automatically populates these property fields with pre-stored values that are associated with the selected network resource. If the non-predefined network resource option is selected, the communicant is presented with a dialog box with property fields in which the communicant can enter the properties of a non-predefined network resource. In some examples, the communicant can enter the URI of a particular network resource, and the platform automatically will retrieve a Label (e.g., the title) and an iconographic representation (e.g., a favicon) associated with the URI. Once the configurable view screen object properties have been set, the Alex Go can save the configuration by selecting the "Save" button or "Cancel" the operation.

Figure 11:
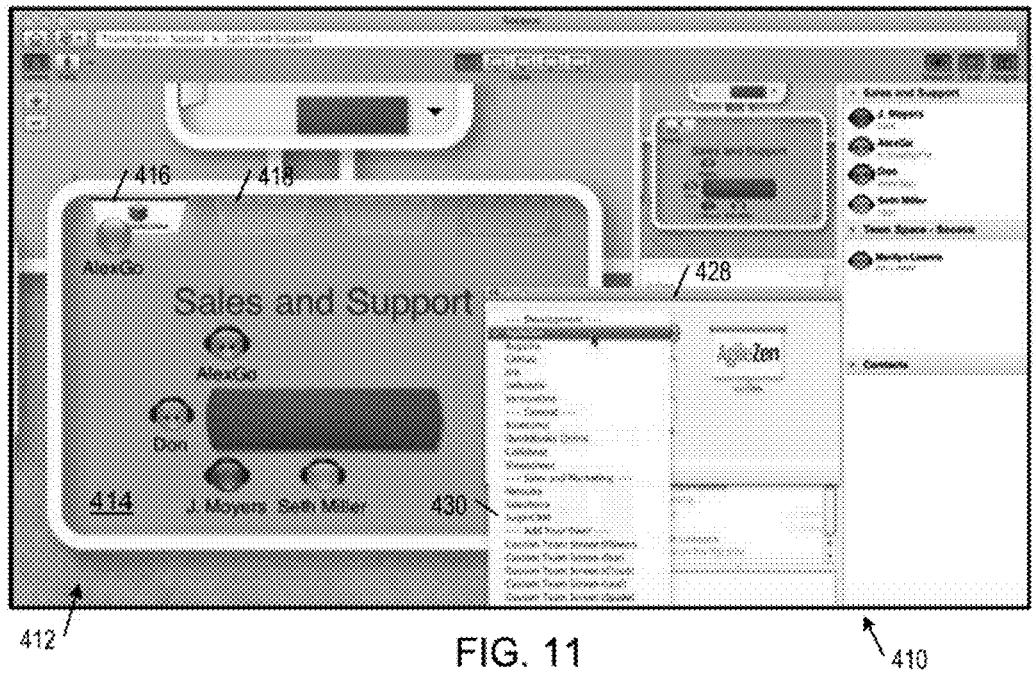

FIG. 11 shows the graphical user interface 410 after Alex GO has activated a dropdown list 430 for selecting a service from the predefined list of network resources or entering the properties of a non-predefined network resource.

Figure 12:
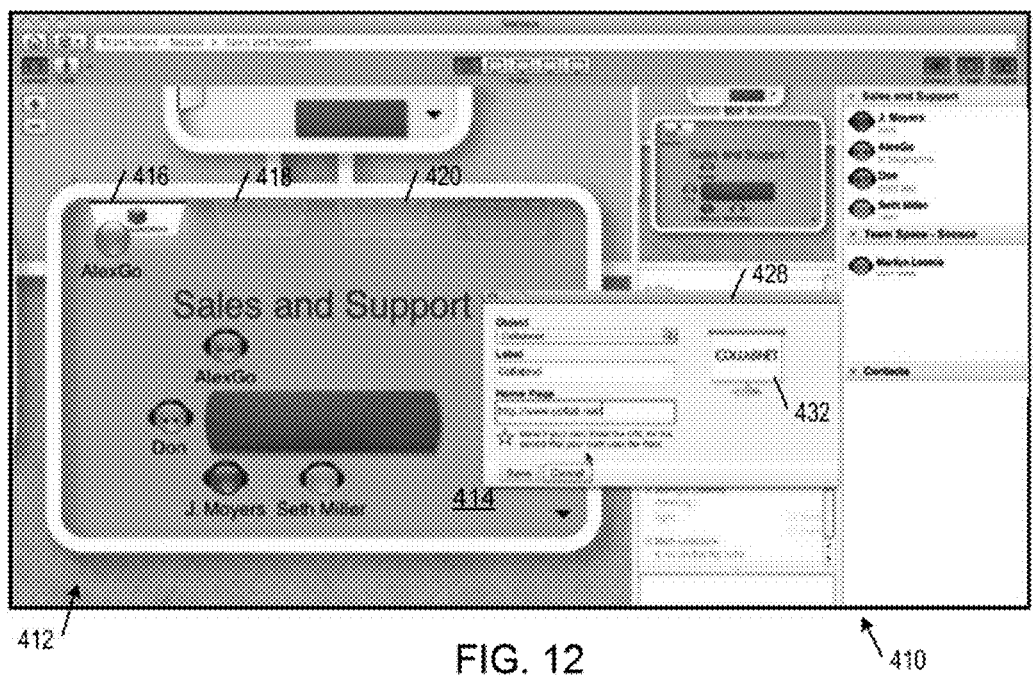

FIG. 12 shows the graphical user interface 410 after Alex Go has selected the Collabnet service from the dropdown list 430. In this example, the platform stored a respective "Label" (e.g., Collabnet), a "Home Page" URI (e.g., http://www.Collabnet.com), and iconographic representation 432 for each of the predefined services. These property values automatically are populated into the corresponding fields of the dialog box 428 in response to the selection of a particular one of the network services from the dropdown list 430. Once the configurable view screen object properties have been set, the Alex Go can save the configuration by selecting the "Save" button in the dialog box 428 or cancel the operation by selecting the "Cancel" button.

Figure 13:
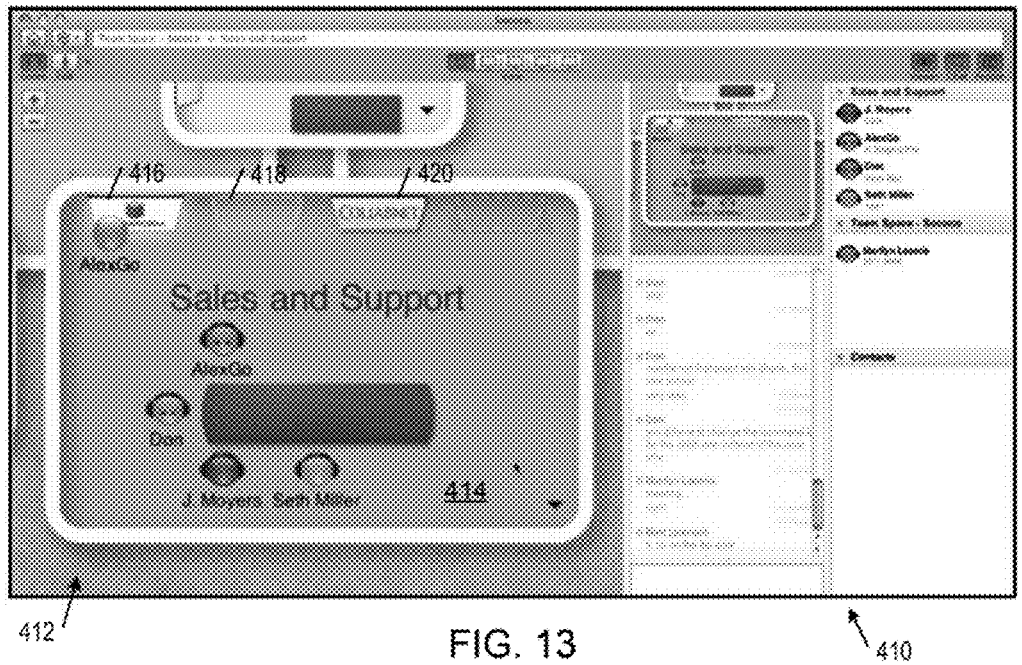

FIG. 13 shows the graphical user interface 420 after Alex Go has selected the "Save" button in the dialog box 428 shown in FIG. 12. In this example, the view screen object 420 is overlaid with the iconographic representation associated with the selected service (i.e., Collabnet), which serves as a visual spatial bookmark in the Sales and Support zone 414 of the Team Space virtual area.

Figure 14:
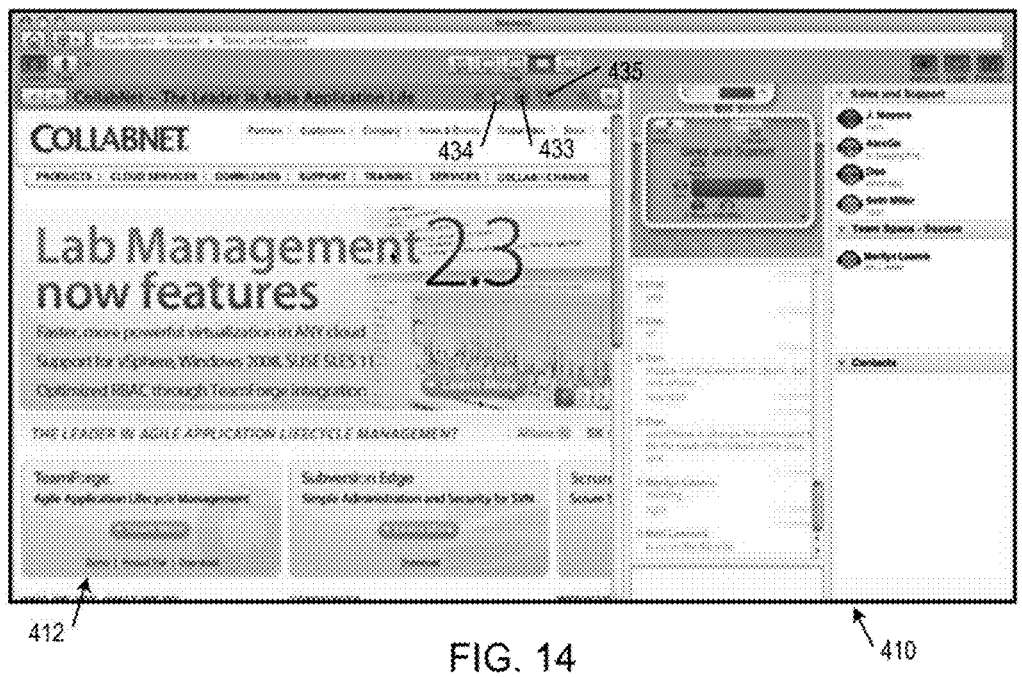

FIG. 14 shows the graphical user interface 410 after Alex Go has activated the view screen object 420 in the state shown in FIG. 13. In this example, the view screen object 420 is associated with the URI for the Collabnet service. In response to the activation of the view screen object 420, the client communications application shows the viewer panel 412 in the browser mode of operation showing the rendered version of the network resource identified by the associated URI (in this example, the URI corresponds to the Collabnet home web page).

Figure 15:
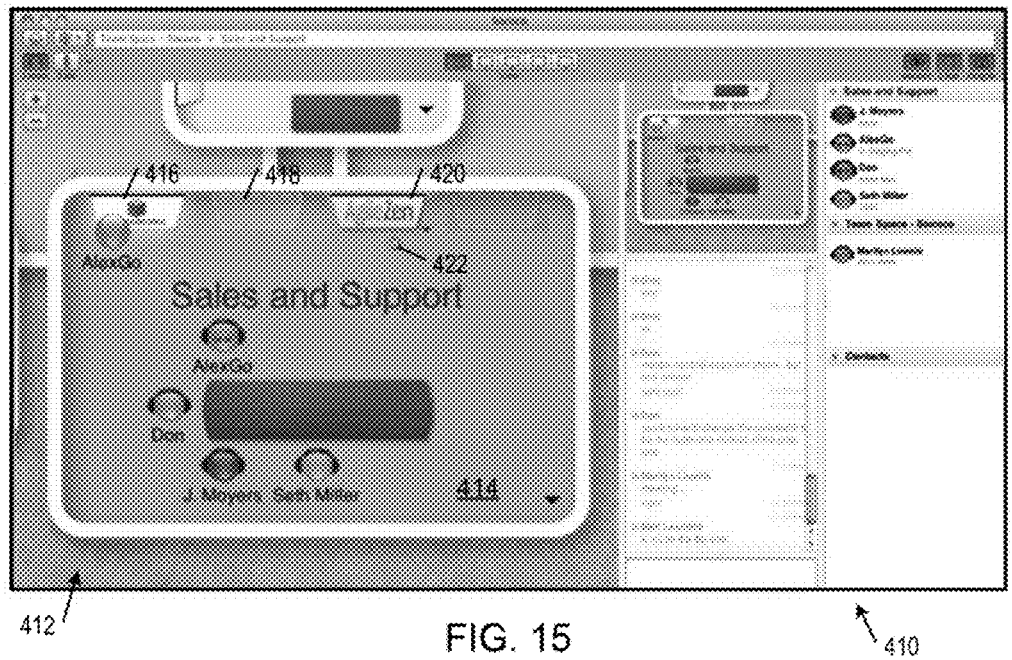

FIG. 15 shows the graphical user interface 410 with the view screen object 420 associated with the AgileZen web service.

Figure 16:
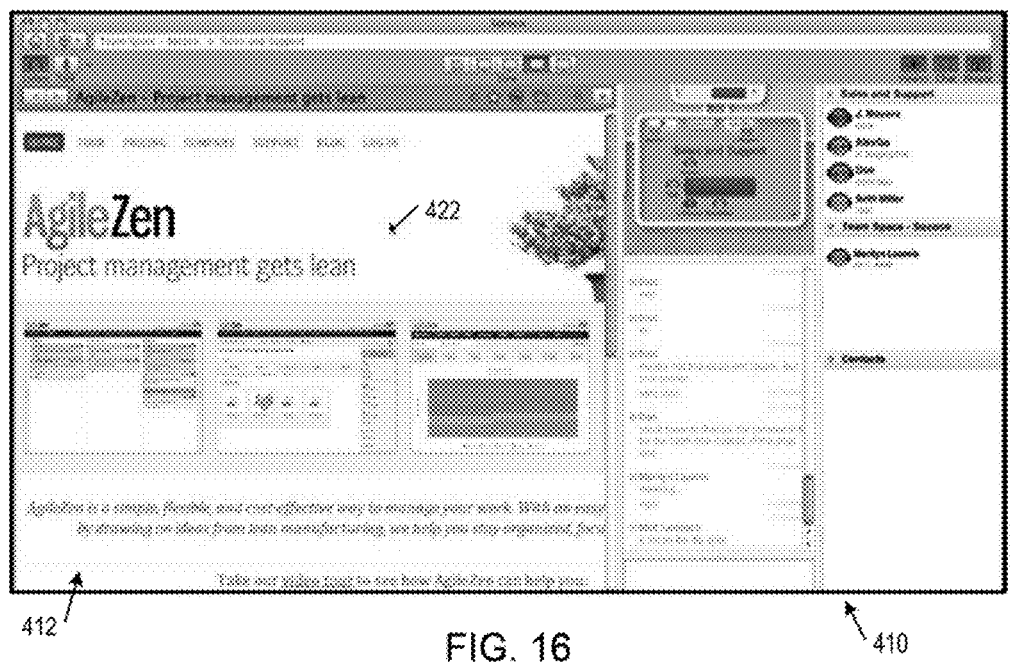
Figure 17:
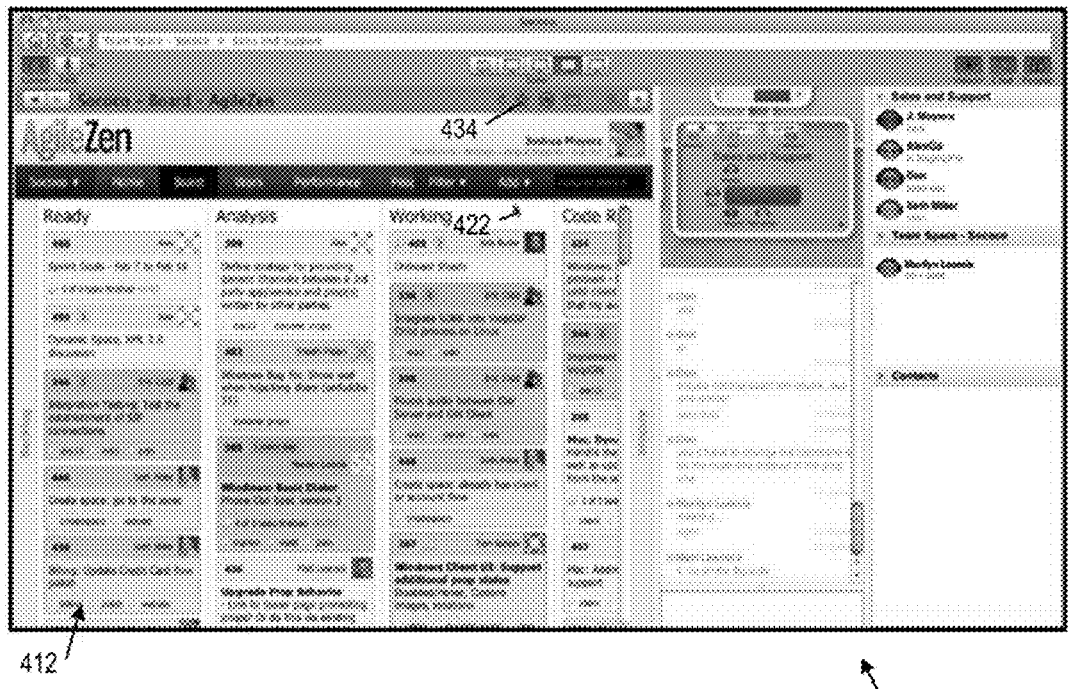

FIG. 16 shows the graphical user interface 410 after Alex Go has activated the view screen object 420 in the state shown in FIG. 15. In this example, the view screen object 420 is associated with the URI for the AgileZen service. In response to the activation of the view screen object 420, the client communications application shows the viewer panel 412 in the browser mode of operation showing the rendered version of the network resource identified by the associated URI (in this example, the URI corresponds to the AgileZen home web page). Using the browser functionality of the client network node, Alex Go can navigate to a particular active project within the AgileZen web site, as shown in FIG. 17.

Figure 18:
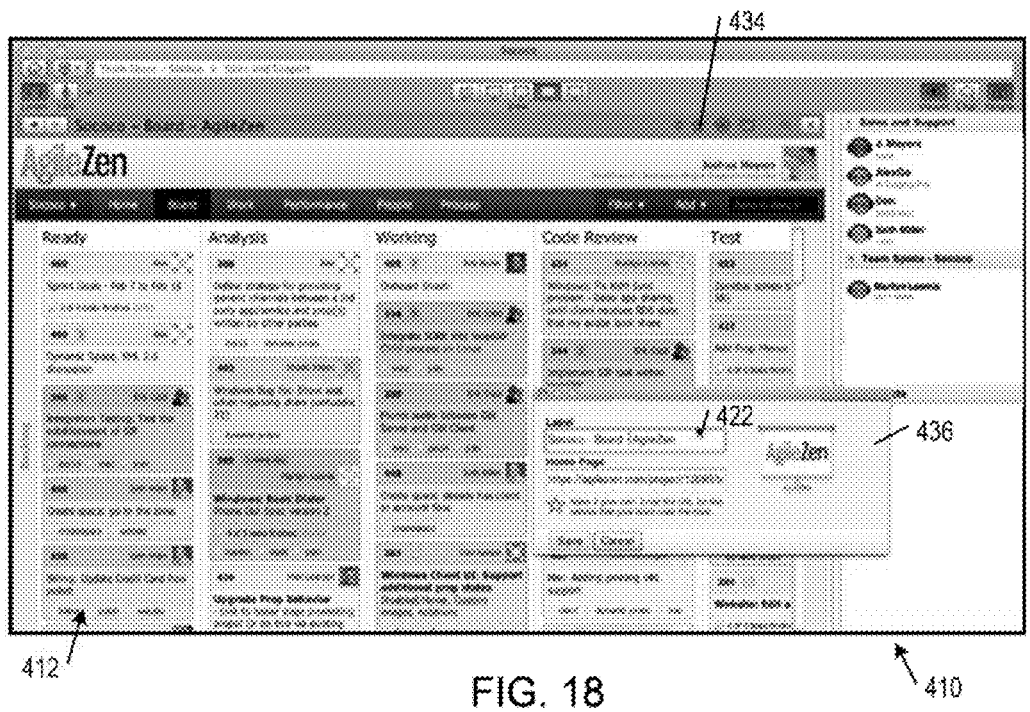

FIG. 18 shows the graphical user interface after Alex Go has selected the bookmark (or "pinning") button 434, which is represented by a star icon. In response to the selection of the bookmark button 434, the client communications application extracts information from the network resource that can be used to change the properties of the current view screen object. In some examples, the client communications application extracts the URI, the title, and any iconographic representation (e.g., a favicon) of the network resource. A web server of the virtual environment creator 18 sends a web page for an object property change dialog box to the browser component of the client network node. Before the browser component displays the dialog box, the client information populates the object property fields of the dialog box with the information that was extracted from the network resource. The browser component then displays the dialog box to enable Alex Go to confirm the changes to the URI and possibly the Label associated with the view screen object 420 from the AgileZen home page to the URI and title of Alex Go's active project within the AgileZen web site. The dialog box 436 allows Alex Go to save the configuration by selecting the "Save" button in the dialog box 436 or cancel the operation by selecting the "Cancel" button.

Figure 19:
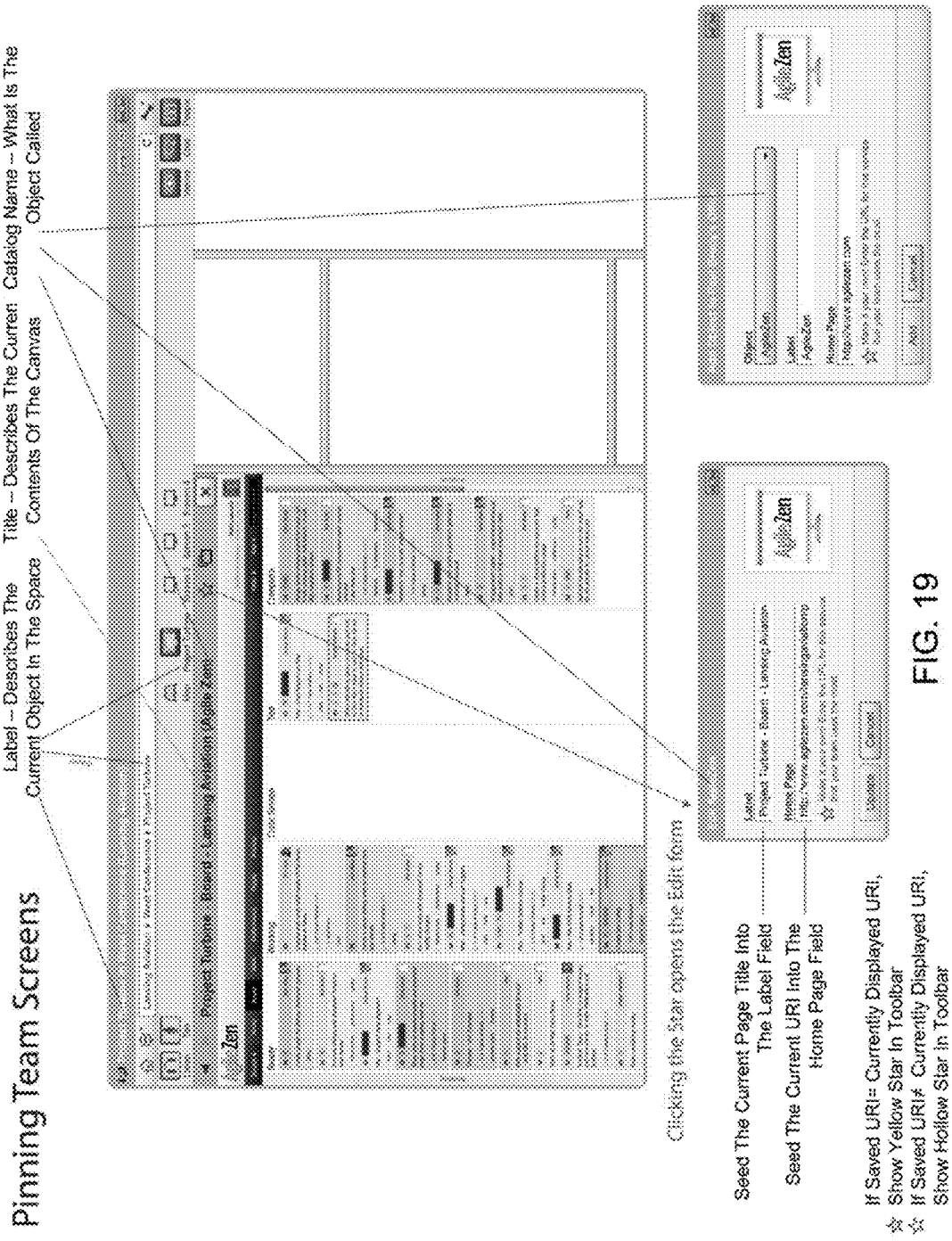

Examples of the graphical user interface elements relating to the bookmarking (or pinning) functionality of the platform as show in FIG. 19.

Figure 20:
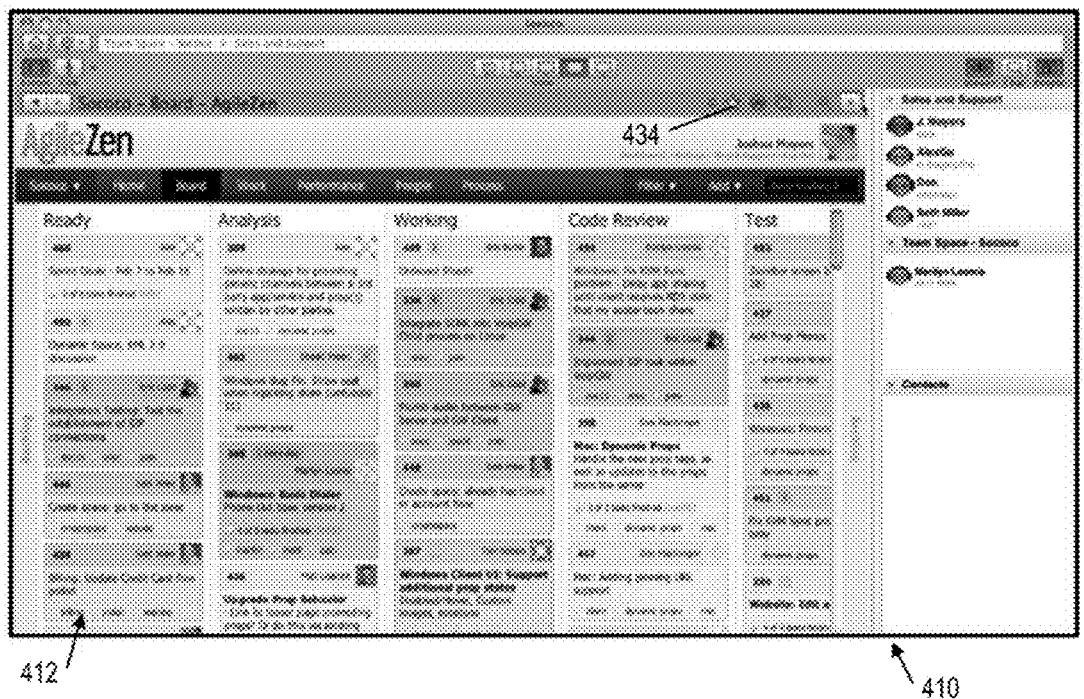

After the configuration has been saved, the bookmark button 434 is highlighted (e.g., by filling the bookmark button 434 with a brighter color) when the current page show in the viewer panel 412 is pointing to the URI associated with view screen object 420 as shown in FIG. 20. When the browser navigates away from the URI associated with the view screen object, the bookmark button is shown unhighlighted (e.g., by filling the bookmark button 434 with a darker color) as shown, for example, in FIGS. 17 and 18.

Figure 21:
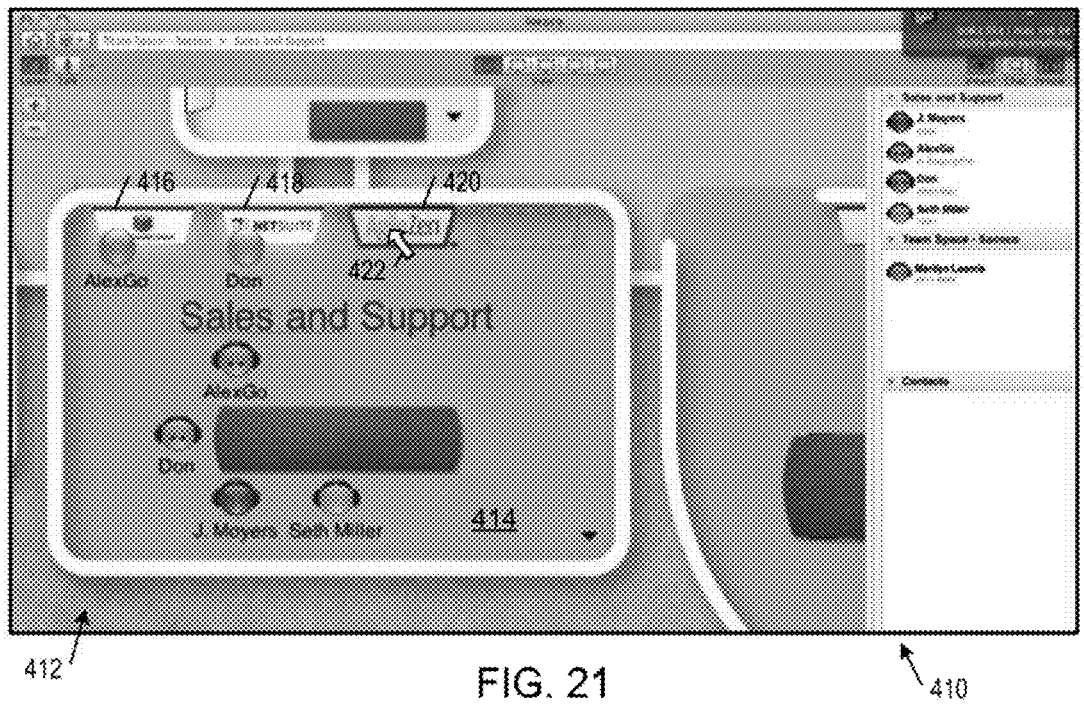
Figure 22:
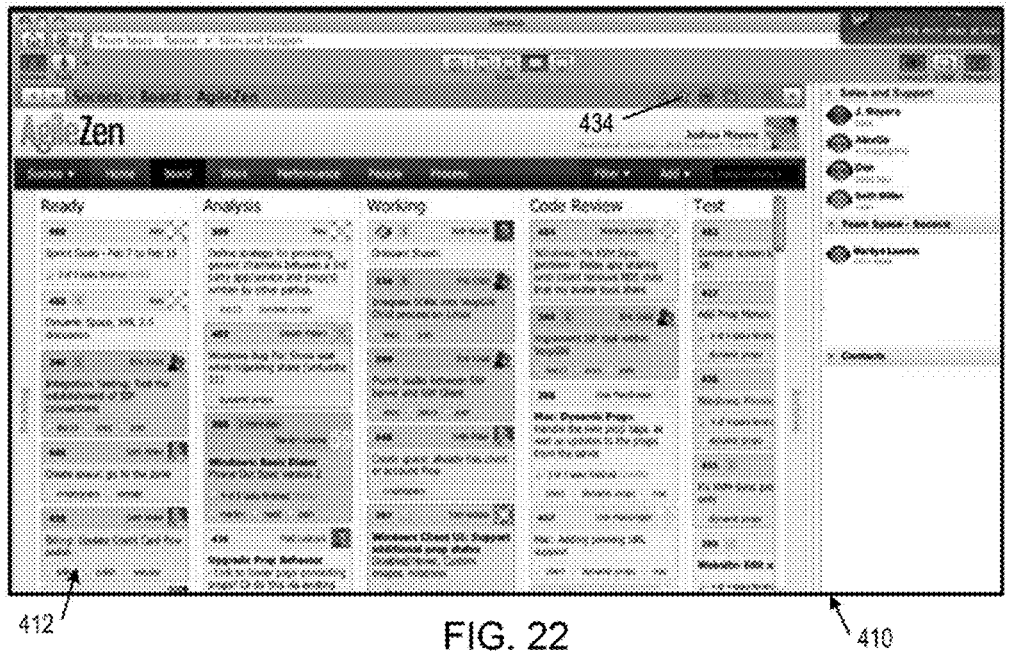

FIG. 21 shows the graphical user interface 410 with the viewer panel 412 in the Map mode after the view screen object 420 has been associated with the URI for Alex Go's active project within the AgileZen web site. The view screen object 420 now can be activated with a single click of the input device associated with the pointer 422 to immediately access the active project page, as shown in FIG. 22. It is noted that the browser component on the client network node typically stores session and login credentials so that the communicant can immediately access a desired web page without having to go through a login page or other authentication mechanism.

Figure 23:
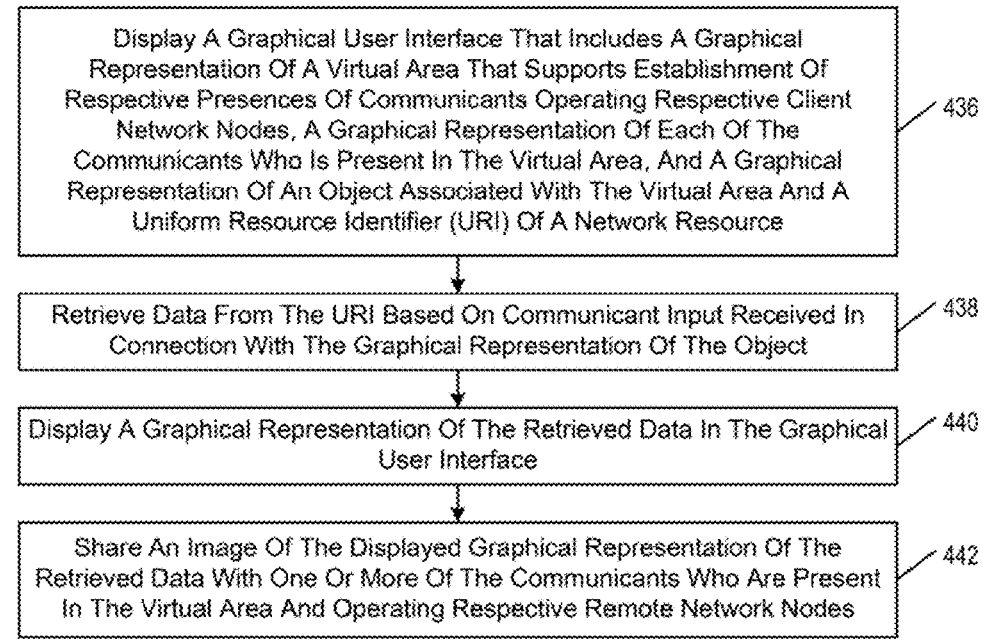
FIG. 23 is a flow diagram of an example of a network resource sharing method.

FIG. 23 shows an example of a network resource sharing method performed by a client network node operating as a moderator. In accordance with this method, the client network node displays a graphical user interface that includes a graphical representation of a virtual area that supports establishment of respective presences of communicants operating respective client network nodes, a graphical representation of each of the communicants who is present in the virtual area, and a graphical representation of an object associated with the virtual area and a uniform resource identifier (URI) of a network resource (FIG. 23, block 436). The client network node retrieves data from the URI based on communicant input received in connection with the graphical representation of the object (FIG. 23, block 438). In some examples, the communicant input is selection of the object. The client network node displays a graphical representation of the retrieved data in the graphical user interface (FIG. 23, block 440). The client network node share an image of the displayed graphical representation of the retrieved data with one or more of the communicants who are present in the virtual area and operating respective remote network nodes (FIG. 23, block 442). The client network node typically shares a stream of updated images of the graphical representation of the retrieved data that reflect changes in the retrieved data over time.

In some examples, instead of or in addition to screen sharing the rendered contents of a network resource being rendered in the viewer panel of a moderator's graphical user interface, the moderator's client network node automatically shares the URI of that network resource. These examples have particular utility when used to share a network resource (e.g., Google Docs™) that is configured to synchronize in real time the views of all the communicants who are concurrently sharing the network resource.

In addition to moderating the sharing of network resource contents with other communicants in the same virtual area, examples of the platform also enable communicants in the virtual area to "take control" of the sharing to become the new moderator and to render a "private view" of the contents of the URI being shared by the moderator in which the communicant can control the rendering and navigation independently of the moderator.

As an example of the "take control" functionality, if Alex currently is sharing a network resource identified by a URI associated with a view screen object, Don can click the view screen object to view the contents of Alex's share, and then click a "take control" button in the graphical user interface to take control of the share. Don's client network node now renders the URI contents locally and sends out a scraped image to the other communicants in the area who subscribed to the shared content by selecting the view screen object. In this way, communicants can alternately take control of the sharing session. FIG. 14 shows an example of a "take control" button 433 by a steering wheel icon to the right of the star button 434.

In some examples, the "take control" functionality is implemented without a separate "take control" button as follows. The moderator's client network node transmits the URI of a network resource being shared to each of the viewer client network nodes. Each of the viewer client network nodes populates the location bar 116 in the viewer panel of the client application graphical user interface with the transmitted URI. In response to a particular viewer communicant's selection of the Go button 118 in the navigation area 110 of the client application graphical user interface, the particular viewer communicant's client application notifies the platform that the Go button 118 was selected. The platform configures each of the network nodes involved in the sharing session so that the moderator function now is performed by the network node of the particular communicant who has taken control and the other client network nodes function as viewer network nodes. The client network node of the new moderator passes the URI to the local browser component, which renders the network resource identified by the URI in the viewer panel of the graphical user interface. The client network node of the new moderator also shares images of the output rendered by the browser component with the other client network nodes involved in the screen sharing session. The new moderator now can navigate to different network resources (e.g., web pages) or take control of a document editing session in Google Docs™.

In some examples, a viewer communicant may not be able to take control of a sharing session unless certain conditions are satisfied. For example, the platform may require the viewer to have a particular capability or it may require the current moderator to be in a particular state (e.g., inactive for a particular period).

As an example of the "private view" functionality, if Alex currently is sharing a network resource identified by a URI associated with a view screen object, Don can click a "private view" button in the graphical user interface to open a separate view of the network resources identified URI in a local browser application (e.g., the Firefox browser application) that is separate from the browser functionality of the communications application 28. This is useful for communicants who want to open up a second copy of the URI contents and change the view (e.g., zoom in, zoom out, scroll to a different part of the rendered contents), navigate to a different URI, make edits, etc. while still being able to watch the shared view in the graphical user interface of the communications application 28. The Private View button is in FIG. 14 shows an example of a "private view" button 435 by a layered rectangle icon to the right of the steering wheel button 433. In other examples, the "private view" button 435 is represented by an iconographic representation of the separate browser application.

Figure 24:
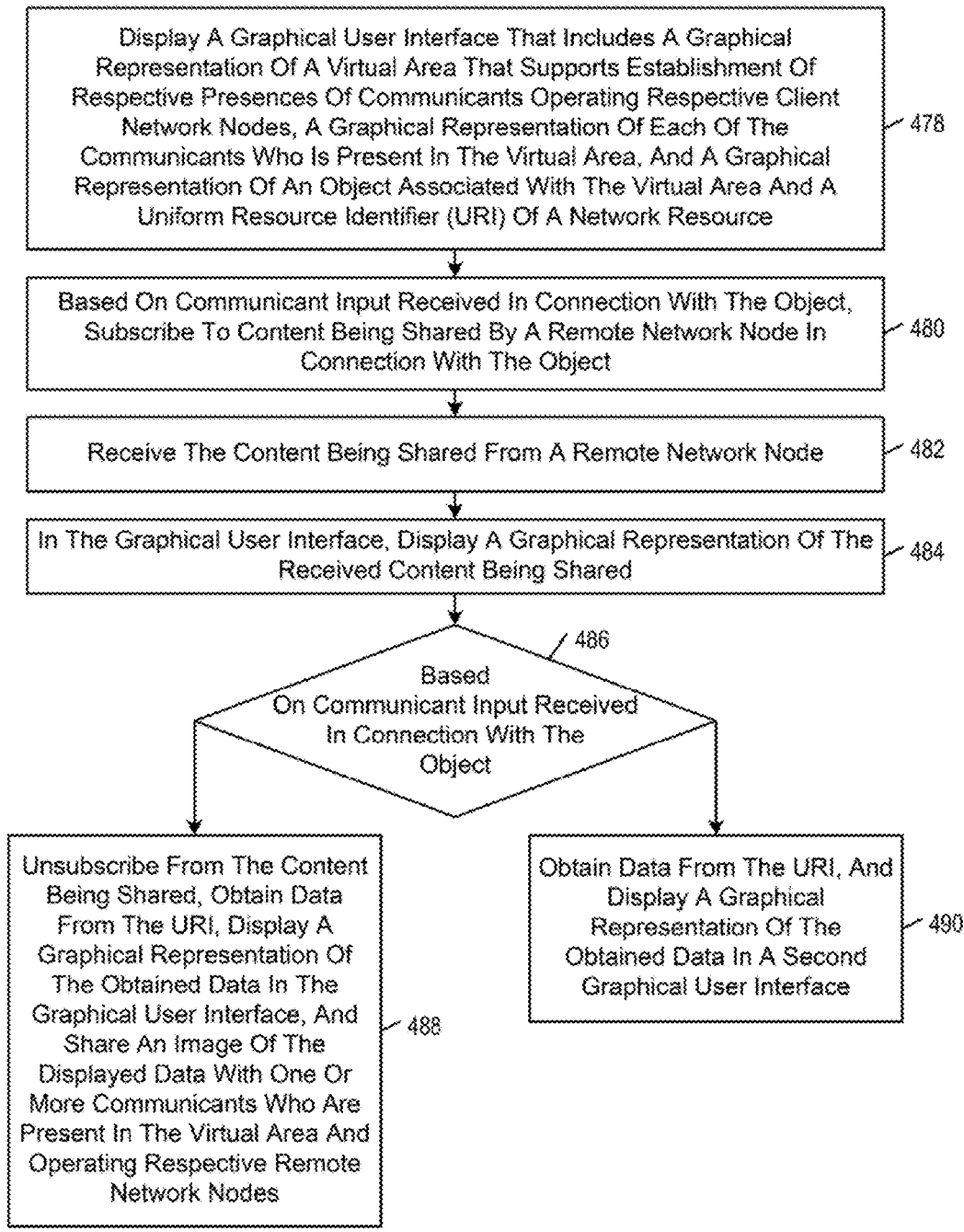
FIG. 24 is a flow diagram of an example of a network resource sharing method.

FIG. 24 shows an example of a network resource sharing method performed by a client network node operating as a viewer. In accordance with this method, the client network node displays a graphical user interface that includes a graphical representation of a virtual area that supports establishment of respective presences of communicants operating respective client network nodes, a graphical representation of each of the communicants who is present in the virtual area, and a graphical representation of an object associated with the virtual area and a uniform resource identifier (URI) of a network resource (FIG. 24, block 478). Based on communicant input received in connection with the object, the client network node subscribes to content being shared by a remote network node in connection with the object (FIG. 24, block 480). In some examples, the client network node subscribes to the shared content based on communicant selection of an active viewscreen object. The client network node receives the content being shared from a remote network node (FIG. 24, block 482). In some examples, the client network node may receive the shared content from the sharing network node either directly over a peer-to-peer network connection or indirectly over a server mediated network connection. In the graphical user interface, the client network node displays a graphical representation of the received content being shared (FIG. 24, block 484). Based on communicant input received in connection with the object, the client network node may enter a "take control" mode of operation or a "private view" mode of operation (FIG. 24, block 486). In some examples, the client network node enters the take control mode operation based on user selection of the take control button 433 in the graphical user interface or user selection of the Go button 118 associated with the target URI in the location bar 116 in the navigation area 110 of the graphical user interface. In the take control mode of operation, the client network node unsubscribes from the content being shared, obtains data from the URI, displays a graphical representation of the obtained data in the graphical user interface, and shares an image of the displayed data with one or more communicants who are present in the virtual area and operating respective remote network nodes (FIG. 24, block 488). In the private view mode of operation, the client network node obtains data from the URI, and displays a graphical representation of the obtained data in a second graphical user interface (FIG. 24, block 490).

Figure 25:
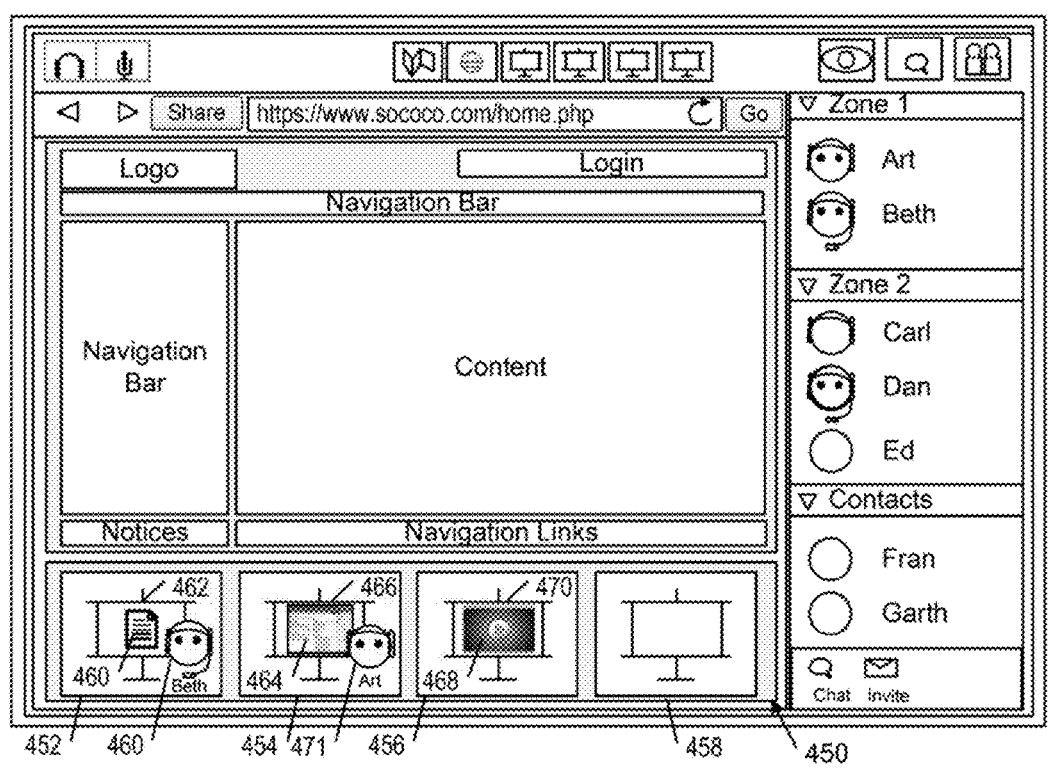
FIG. 25 is a diagrammatic view of an example of a graphical user interface.

FIG. 25 shows an example 448 of the graphical user interface 70 (see, e.g., FIGS. 2-4) that includes a "dock" interface 450 that provides a preview of the contents associated with each of the view screen objects in the user's current zone of presence. In the illustrated example, the current zone of presence is Zone 1, which includes the four view screen objects 388-394 (see FIG. 3). The dock interface 450 includes a respective preview panel 452, 454, 456, 458 for each of the view screen objects in the zone.

If a particular view screen object is associated with content that currently is being shared in the zone, the associated preview panel shows a video sequence of images of the shared content. For example, Beth is sharing a local application (e.g., a Microsoft® Word document) in connection with the view screen object 388, and the associated preview panel 452 shows a stream of thumbnail images 460 of the shared local application content in the iconographic representation 464 of the view screen object 388 in the preview panel 452. In addition, the preview panel 452 shows an iconographic representation 466 of the sharing communicant (i.e., Beth). Similarly, Art is sharing a network resource (e.g., a network service application) in connection with the view screen object 390, and the associated preview panel 454 shows a stream of thumbnail images 464 of the shared network resource content in the iconographic representation 466 of the view screen object 390 in the preview panel 454, along with an iconographic representation 467 of Art.

If a particular view screen object is associated with a network resource that is not currently being shared, the associated preview panel shows a preview of a local rendering of the network resource. For example, the view screen object 392 is associated with a network resource corresponding to a video file (e.g., a YouTube™ video), and the associated preview panel 456 shows a browser image 468 of the page associated with the video file in the iconographic representation 470 of the view screen object 392 in the preview panel 456. In this process, the local client application 28 passes the URI for the video file to the local browser component, which renders a browser image 468 of the page identified by the URI in the associated preview panel 456.

The virtual environment creator 10 may communicate with the client network nodes 12, 14 in a variety of different ways in the process of enabling communicants to associate network resources with objects in a virtual area to create the visual spatial bookmarks described herein.

Figure 26:
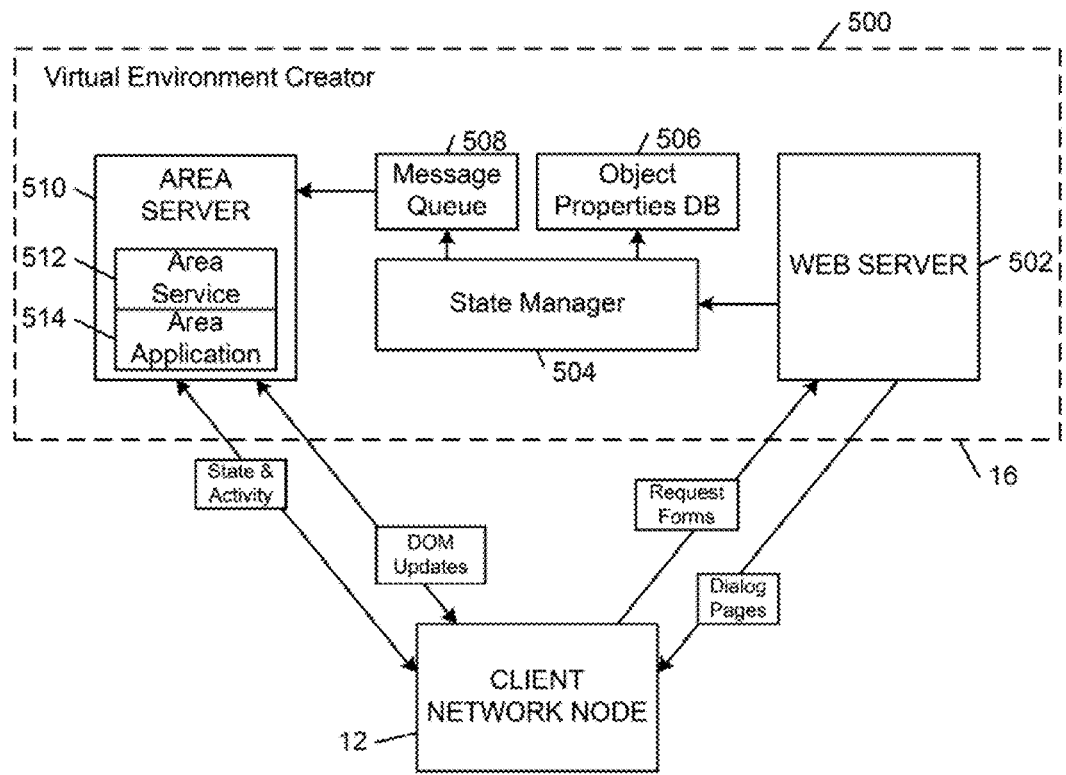
FIG. 26 is a diagrammatic view of an example of a network communications environment that includes first and second client network nodes and a virtual environment creator that includes at least one server network node.

FIG. 26 shows an example 500 of the virtual environment creator 18 that manages the process of associating network resources with objection in a virtual area and distributing those associates to all the communicants in the virtual area. The virtual environment creator 500 includes a web server 502, a state manager 504, an object properties database 506, a message queue 508, and an area service 510.

The web server 502 communicates with the browser component on the client network node 12. The web server 502 sends to the web browser component preformatted web documents (e.g., a hypertext markup language (HTML) document) that the browser component displays as interface components (e.g., dialog boxes) in the viewer panel. The use of web pages to create interface components on the client network node allows a system administrator to rapidly change the content and appearance of the interface components on the fly without having to change the communications application running on the client network node (e.g., by having to rewrite the client application code and distribute new executable code to the communicants in the virtual area).

The browser component sends to the web server 502 request forms that contain communicant inputs (e.g., inputs specifying object property changes) in connection with dialog boxes and objects in the virtual area. For example, when a communicant in the virtual area interacts with an object in the virtual area (e.g., the communicant positions a pointer over the graphic representation of the object), interface component on the client network node 12 passes the input and an identifier for the object (Object_ID) to the browser component, which sends to the web server 502 a request form that includes the Object_ID and describes the user input. In response, the web server sends to the browser component a web page that is associated with the type of user interaction with the object. In some examples, the web page specifies a specific display size (e.g., 600 pixels wide by 300 pixels high) for the dialog box. The client browser component displays the web page as a dialog box of the specific size in the viewer panel.

The web server 502 passes object property changes to the state manager 504. The state manager 504 writes the object property changes to the object properties database 506, which contains records of all the objects in the virtual area and the properties of those objects. The state manager 504 also writes the object property changes to messages that are stored in the message queue 508.

The message queue is a message broker that provides an asynchronous communications protocol between the web server 504 and the area server 510. In some examples, the message queue is implemented by the HornetQ message queue available from Red Hat, Inc., North Carolina, U.S.A. The area server 510 registers its URI with the message queue 508 and the message queue pushes the object change messages to the area server 510

The area service 512 administers the area application 512 and cooperates with the rendezvous service to create a virtual area for realtime communications between communicants. The area service 512 receives object property change messages from the message queue 508. The area service 510 updates the document object models (DOMs) for the changed objects based on the object property change messages, and distributes the updated DOMs to all the client network nodes that are connected to the virtual area.

Figure 27:
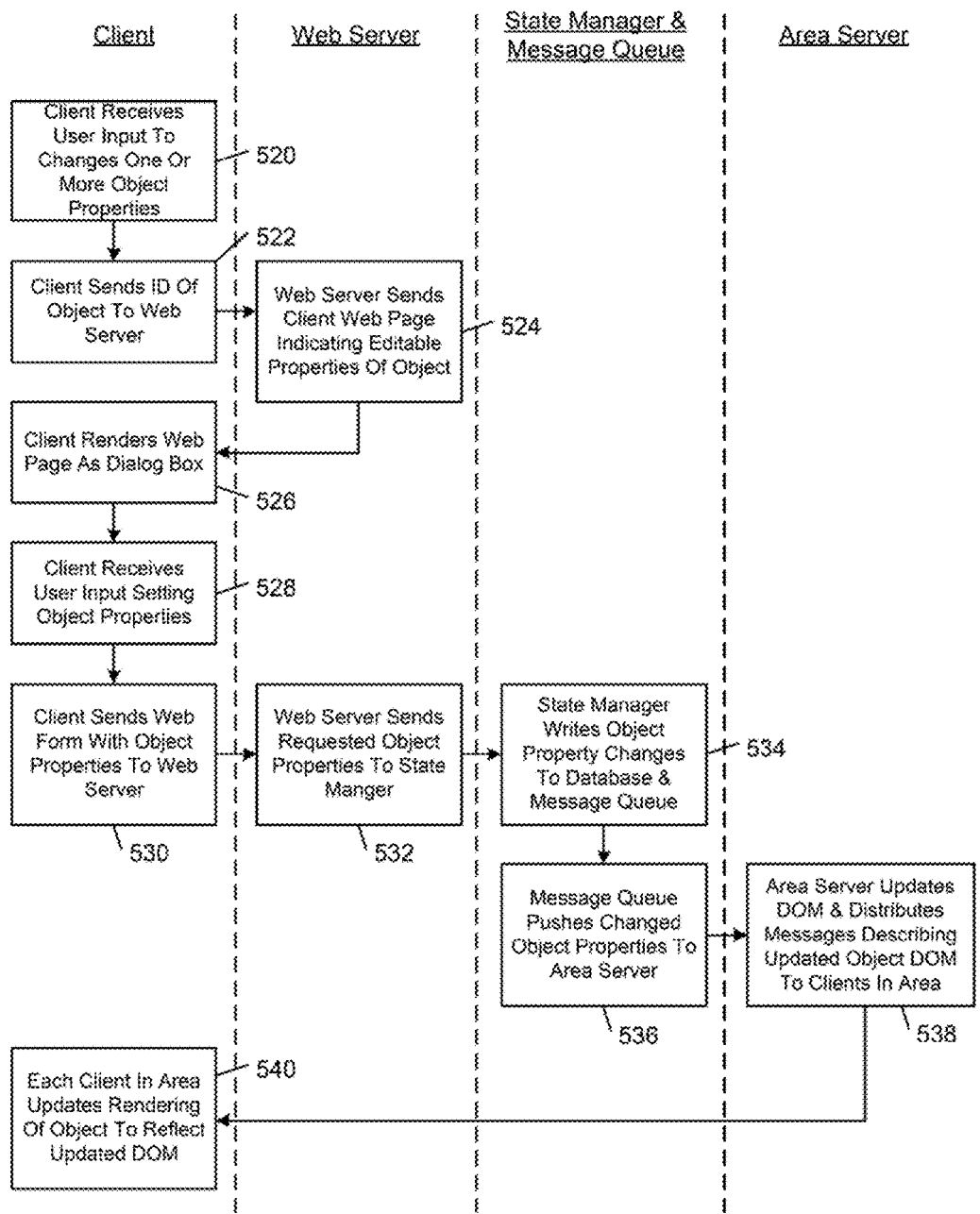
FIG. 27 is a flow diagram of an example of information flows between the client network node and components of the virtual environment creator shown in FIG. 26.

FIG. 27 shows a flow diagram of an example of a process by which object property changes are processed and distributed to the communicants in an area. In this example, the client network node 12 receives user input to change one or more properties of a selected object (FIG. 27, block 520). For example, the client network node 12 may receive user input to provision an unprovisioned object, modify one or more properties of a currently provisioned object, or remove the properties of a currently provisioned object. The client network node 12 sends the Object_ID of the selected object to the web server 502 (FIG. 27, block 522). The web server 502 sends to the client network node 12 a web page that indicates the editable properties of the object (FIG. 27, block 524). In some examples, the editable properties of the object include a Label, a URI, and an iconographic representation. The client network node 12 renders the web page as a dialog box in the graphical user interface presented to the user (FIG. 27, block 526). The client network node 12 receives user input that sets the requested properties to associate with the selected object (FIG. 27, block 528). The client network node 12 sends to the web server 502 a web form that contains the Object_ID and the requested property changes to associate with the Object_ID (FIG. 27, block 530). The web server 502 sends the requested property changes to the state manager 504 (FIG. 27, block 532). The state manager 504 writes the object property changes to the object properties database 506 and the message queue 508 (FIG. 27, block 534). The message queue 508 pushes the object property changes to the area server 510 (FIG. 27, block 536). The area server 510 updates the document object model (DOM) associated with the Object_ID and distributes the updated DOM to all the client network nodes connected to the virtual area (e.g., being operated by a communicant who is present in the virtual area) (FIG. 27, block 538). In response to receipt of the DOM update message from the area server 510, each client network node updates the rendering of the object corresponding to the Object_ID to reflect the changes made to the DOM for that object (FIG. 27, block 540).

III. Conclusion

Other embodiments are within the scope of the claims.

The invention claimed is:

1. A method, comprising:
    displaying a graphical user interface comprising a graphical representation of a virtual area that supports establishment of respective presences of communicants operating respective client network nodes, a graphical representation of each of the communicants who is present in the virtual area, and a graphical representation of an object associated with the virtual area, wherein the object has a configurable uniform resource identifier (URI) property that enables a communicant who is present in the virtual area to associate the object with a URI of a network resource associated with data;
    requesting a configuration of the configurable URI property of the object to create between the object and a particular URI of a particular network resource a persistent association that is maintained across communication sessions in the virtual area to provide communicants with automatic access to the particular network resource upon entry in the virtual area;
    retrieving data from the particular URI based on communicant input received in connection with the graphical representation of the object;
    displaying a graphical representation of the retrieved data in the graphical user interface; and
    sharing the displayed graphical representation of the retrieved data with one or more respective client network nodes of one or more of the communicants who are present in the virtual area.

2. The method of claim 1, wherein the object is associated with an iconographic image associated with the network resource, and further comprising presenting the iconographic image in connection with the graphical representation of the object.

3. The method of claim 1, wherein the graphical user interface comprises network navigation controls associated with the object, and
    further comprising navigating to a second URI in response to communicant input received in connection with the network navigation controls, obtaining data from the second URI, displaying a graphical representation of the obtained data in the graphical user interface, and sharing the displayed graphical representation of the data obtained from the second URI with one or more respective client network nodes of one or more of the communicants who present in the virtual area.

4. The method of claim 1, wherein the sharing comprises streaming images of the graphical representation of the retrieved data displayed in the graphical user interface to the one or more respective client network nicks.

5. The method of claim 1, further comprising transmitting the particular URI to the one or more respective client network nodes that are sharing the displayed graphical representation of the retrieved data.

6. The method of claim 1, further comprising subscribing to content being shared in connection with a second object in the virtual area by a given client network node of a given one of the communicants who is present in the virtual area, receiving images of the content being shared by the given client network node, and displaying the received images in the graphical user interface in connection with the second object.

7. The method of claim 6, further comprising based on communicant input received in connection with the second object, obtaining data from a second URI associated with the second object, and displaying a graphical representation of the obtained data in the graphical user interface.

8. The method of claim 7, further comprising sharing an image of the displayed graphical representation of the data obtained from the second URI with one or more respective client network nodes of one or more of the communicants who are present in the virtual area.

9. The method of claim 6, further comprising receiving a second URI from the client network node of the given communicant in connection with the second object, unsubscribing from the content being shared in connection with a second object, obtaining data from the second URI, displaying a graphical representation of the obtained data in the graphical user interface, and sharing the displayed graphical representation of the data obtained from the second URI with one or more respective client network nodes of one or more of the communicants who are present in the virtual area.

10. The method of claim 6, further comprising receiving a second URI from the client network node of the given communicant in connection with the second object, obtaining data from the second URI, and displaying a graphical representation of the data obtain from the second URI in a graphical user interface.

11. The method of claim 1, wherein the graphical user interface comprises a preview panel associated with the object, and further comprising displaying in the preview panel a reduced resolution version of the graphic representation of the retrieved data being shared.

12. The method of claim 11, further comprising displaying in the preview panel the graphical representation of the respective communicant operating the client network node performing the sharing.

13. The method of claim 11, wherein the virtual area is associated with a second object, the graphical user interface comprises a second preview panel associated with the second object, and further comprising displaying in the second preview panel a reduced resolution version of content being shared in connection with the second object by the respective client network node of a communicant who is present in the virtual area.

14. The method of claim 13, further comprising displaying in the second preview panel the graphical representation of the communicant operating the respective client network nod sharing the content in connection with the second object.

15. The method of claim 11, wherein the virtual area is associated with a second object that is associated with a second URI, the graphical user interface comprises a second preview panel associated with the second object; and further comprising obtaining data from the second URI, and displaying in the second preview panel a graphical representation of the obtained data.

16. The method of claim 1, wherein the particular URI is a uniform resource locator (URL) and the network resource is a network service addressed by the URL.

17. The method of claim 1, wherein the requesting is directed to a network service that stores a record of the association between the object and the designated URI that persists after the communicants have left the virtual area, and retrieves the designated URI from the stored record to provide the communicants automatic access to the network resource upon re-entry into the virtual area.

18. The method of claim 1, further comprising presenting a dialog box that comprises a communicant-configurable URI property field for receiving a communicant-specified URI to be associated with the object and a communicant-configurable label property field for receiving a communicant-specified label to be associated with the object.

19. Apparatus, comprising:
a memory storing processor-readable instructions; and
a processor coupled to the memory, operable to execute the instructions, and based at least in part on the execution of the instructions operable to perform operations comprising
displaying a graphical user interface comprising a graphical representation of a virtual area that supports establishment of respective presences of communicants operating respective client network nodes, a graphical representation of each of the communicants who is present in the virtual area, and a graphical representation of an object associated with the virtual area, wherein the object has a configurable uniform resource identifier (URI) property that enables a communicant who is present in the virtual area to associate the object with a URI of a network resource associated with data;
requesting configuration of the configurable URI property of the object to create between the object and a particular URI of a particular network resource a persistent association that is maintained across communication sessions in the virtual area to provide communicants with automatic access to the particular network resource upon entry in the virtual area;
retrieving data from the particular URI based on communicant input received in connection with the graphical representation of the object;
displaying a graphical representation of the retrieved data in the graphical user interface; and
sharing the displayed graphical representation of the retrieved data with one or more respective client network nodes of one or more of the communicants who are present in the virtual area.

20. At least one non-transitory computer-readable medium having processor-readable program code embodied therein, the processor-readable program code adapted to be executed by a processor to perform operations comprising:
displaying a graphical user interface comprising a graphical representation of a virtual area that displaying a graphical user interface comprising a graphical representation of a virtual area that supports establishment of respective presences of communicants operating respective client network nodes, a graphical representation of each of the communicants who is present in the virtual area, and a graphical representation of an object associated with the virtual area, wherein the object has a configurable uniform resource identifier (URI) property that enables a communicant who is present in the virtual area to associate the object with a URI of a network resource associated with data;

requesting a configuration of the configurable URI property of the object to create between the object and a particular URI of a particular network resource a persistent association that is maintained across communication sessions in the virtual area to provide communicants with automatic access to the particular network resource upon entry in the virtual area;

retrieving data from the particular URI based on communicant input received in connection with the graphical representation of the object;

displaying a graphical representation of the retrieved data in the graphical user interface; and sharing the displayed graphical representation of the retrieved data with one or more respective client network nodes of one or more of the communicants who are present in the virtual area.

* * * * *